United States Patent
Nodine et al.

(10) Patent No.: US 12,435,333 B2
(45) Date of Patent: Oct. 7, 2025

(54) PARALLEL ANALYSIS OF RNA 5' ENDS FROM LOW-INPUT RNA

(71) Applicant: GMI—Gregor-Mendel-Institut fuer Molekulare Pflanzenbiologie GmbH, Vienna (AT)

(72) Inventors: Michael Douglas Nodine, Vienna (AT); Michael Schon, Vienna (AT); Max Kellner, Cambridge, MA (US)

(73) Assignee: GMI—Gregor-Mendel-Institut fuer Molekulare Pflanzenbiologie GmbH, Vienna (AT)

( * ) Notice: Subject to any disclaimer, the term of this patent is extended or adjusted under 35 U.S.C. 154(b) by 1226 days.

(21) Appl. No.: 17/264,467

(22) PCT Filed: Jul. 30, 2019

(86) PCT No.: PCT/EP2019/070458
§ 371 (c)(1),
(2) Date: Jan. 29, 2021

(87) PCT Pub. No.: WO2020/025599
PCT Pub. Date: Feb. 6, 2020

(65) Prior Publication Data
US 2021/0284997 A1   Sep. 16, 2021

Related U.S. Application Data

(60) Provisional application No. 62/712,156, filed on Jul. 30, 2018.

(51) Int. Cl.
| | | |
|---|---|---|
| *C12Q 1/68* | (2018.01) | |
| *C12N 15/10* | (2006.01) | |
| *C12Q 1/6806* | (2018.01) | |
| *C12Q 1/6874* | (2018.01) | |

(52) U.S. Cl.
CPC ....... *C12N 15/1096* (2013.01); *C12Q 1/6806* (2013.01); *C12Q 1/6874* (2013.01)

(58) Field of Classification Search
CPC .......................... C12N 15/1096; C12Q 1/6806
See application file for complete search history.

(56) References Cited

U.S. PATENT DOCUMENTS

2021/0284997 A1 * 9/2021 Nodine ............... C12Q 1/6806

FOREIGN PATENT DOCUMENTS

| WO | WO-2014066179 A1 * | 5/2014 | ......... C12N 15/1096 |
| WO | 2017048993 A1 | 3/2017 | |
| WO | WO-2020025599 A1 * | 2/2020 | ......... C12N 15/1096 |

OTHER PUBLICATIONS

Bolduc et al., 2016. Preparation of Low-Input and Ligation-Free ChIP-seq Libraries Using Template-Switching Technology. Current Protocols in Molecular Biology, 116(1), pp. 7-28. (Year: 2016).*
Kapteyn et al., 2010. Incorporation of non-natural nucleotides into template-switching oligonucleotides reduces background and improves cDNA synthesis from very small RNA samples. BMC genomics, 11, pp. 1-9. (Year: 2010).*
Picelli et al., 2014. Full-length RNA-seq from single cells using Smart-seq2. Nature protocols, 9(1), pp. 171-181. (Year: 2014).*
Schon et la., NanoPARE: parallel analysis of RNA 5' ends from low-input RNA. Genome Res 28: 1931-1942 (Epub Oct. 24, 2018).
Charles Cole et al, "Tn5Prime, a Tn5 based 5' capture method for single cell RNA-seq", Nucleic Acids Research,vol. 46, No. 10, Mar. 14, 2018 (Mar. 14, 2018), p. e62-e62,XP055637367.
Simone Picelli et al., "Full-length RNA-seq from single cells using Smart-seq2", Jan. 1, 2014 (Jan. 1, 2014), vol. 9, No. 1, p. 171-181,XP002742134.
WIPO, Written Opinion of the International Searching Authority issued for PCT/EP2019/070458, filed Jul. 2019 (Feb. 6, 2020).

* cited by examiner

*Primary Examiner* — Gary Benzion
*Assistant Examiner* — Olayinka A Oyeyemi
(74) *Attorney, Agent, or Firm* — Agris & von Natzmer LLP; Joyce von Natzmer

(57) ABSTRACT

Herein provided is a novel method, nanoPARE (parallel analysis of RNA ends from low-input RNA), for generating multiple sequencing libraries from a single full-length cDNA library, specifically an RNA 5' end sequencing library and/or a gene body cDNA library, and method for analyzing RNA 5' ends, and optionally associated software developed therefor. Further provided is a cDNA library generated therefor.

Figure 1:
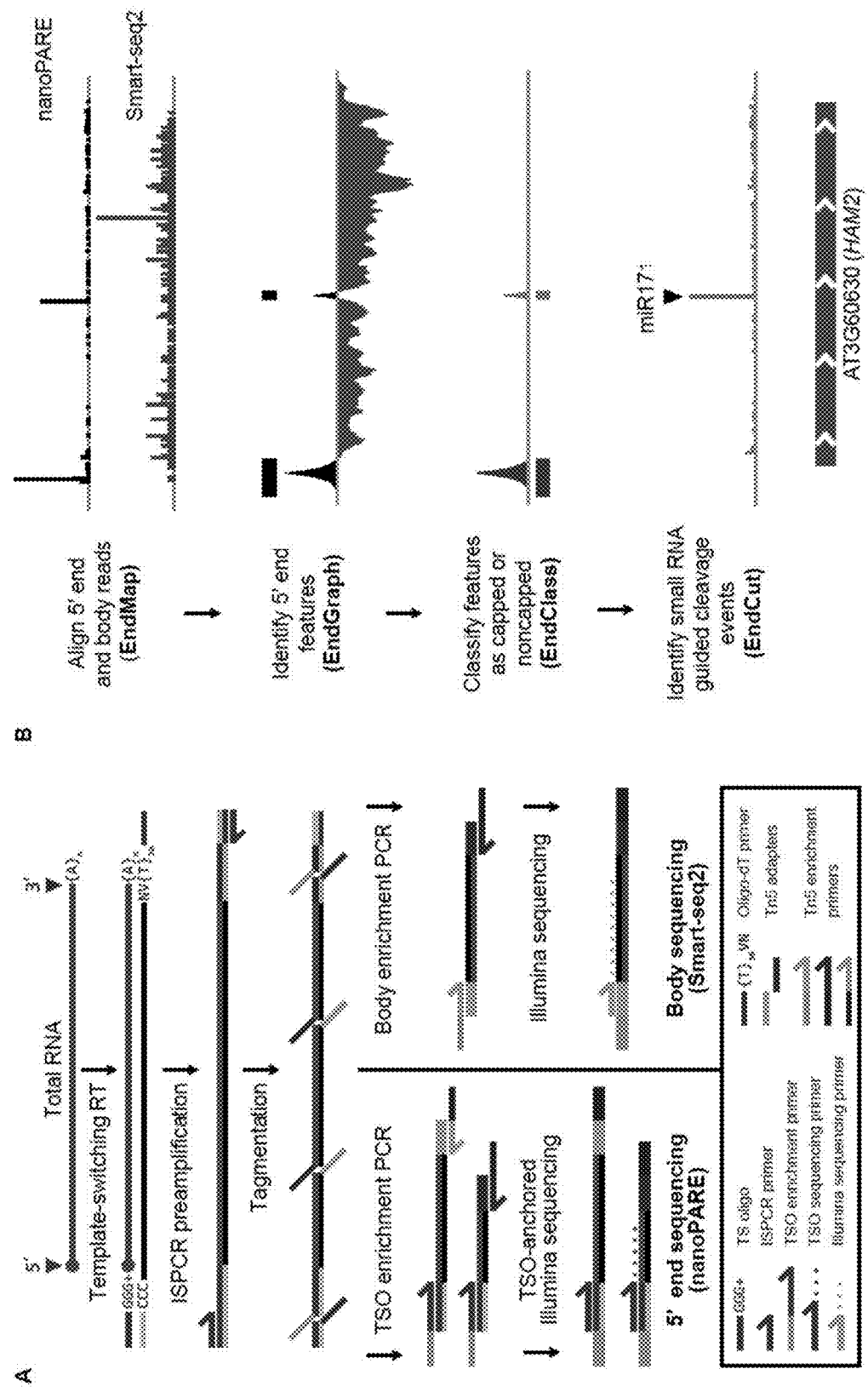

16 Claims, 4 Drawing Sheets
Specification includes a Sequence Listing.

PARALLEL ANALYSIS OF RNA 5' ENDS FROM LOW-INPUT RNA

CROSS-REFERENCE TO RELATED APPLICATIONS

This is the U.S. national stage of International application PCT/EP2019/070458, filed Jul. 30, 2019 designating the United States and claiming the benefit of provisional application No. 62/712,156, filed Jul. 30, 2018.

REFERENCE TO SEQUENCE LISTING SUBMITTED VIA EFS-WEB

This application includes an electronically submitted sequence listing in .txt format. The .txt file contains a sequence listing entitled "2021-05-14_3024-292_ST25.txt" created on May 14, 2021 and is 5,024 bytes in size. The sequence listing contained in this .txt file is part of the specification and is hereby incorporated by reference herein in its entirety.

FIELD OF THE INVENTION

The invention refers to a method for generating multiple sequencing libraries from a single full-length cDNA library, specifically an RNA 5' end sequencing library and/or a gene body cDNA library derived from low input RNA. The method can further be used for analysing RNA 5' ends.

BACKGROUND OF THE INVENTION

Diverse RNA 5' ends are generated during and after transcription, and regulate a variety of gene functions. Alternative transcription start sites (TSS) can generate RNA isoforms that differentially impact cellular functions (Davuluri et al. 2008; Pelechano et al. 2013; Kharytonchyk et al. 2016). Alternative TSS have also been demonstrated to affect downstream translation and protein function through inclusion or exclusion of regulatory N-terminal peptides such as upstream open reading frames or protein localization sequences (Haberle et al. 2014; Cheng et al. 2018). Post-transcriptional maturation of non-coding RNAs such as those involved in splicing (snoRNA) or translation (rRNAs, tRNAs) also generates diverse RNA 5' ends (Granneman et al. 2011; Wang et al. 1988; Henras et al. 2015; Filipowicz and Pogačić 2002). Moreover, small regulatory RNAs such as microRNAs (miRNAs) and small interfering RNAs (siRNAs) can mediate endonucleolytic cleavage of target RNAs and are important regulators of development, genome stability and defense (Bartel 2004; Borges and Martienssen 2015). Therefore, the identification of RNA 5' ends derived from transcriptional and post-transcriptional processes is important for the functional characterization of RNA molecules. Specifically, microRNAs are important regulatory molecules in most eukaryotes and identification of their target mRNA is essential for their functional analysis.

Next-generation sequencing (NGS) based methods have recently been used to identify RNA 5' ends genome-wide. For example, TSS profiling using Cap Analysis of Gene Expression (CAGE) led to the annotation of TSS from polyadenylated mRNA and long non-coding RNA (Andersson et al. 2014; Hon et al. 2017). TSS profiling has also provided fundamental insights into how RNA isoforms with different 5' ends modulate gene function, as recently demonstrated in *Arabidopsis thaliana* (*Arabidopsis*) where the phytochrome photoreceptor regulates alternative promoter usage in a light-dependent manner that ultimately leads to gene products with distinct functions and subcellular localization (Ushijima et al. 2017). Similar methods referred to as PARE (Parallel Analysis of RNA Ends), or degradome, sequencing enrich for 5' monophosphorylated RNAs, which include sRNA-mediated cleavage products. PARE methods therefore enable the genome-wide profiling of sRNA target sites and have been instrumental in characterizing the mechanistic basis of sRNA-mediated developmental and physiological processes (Addo-Quaye et al. 2008; German et al. 2008; Gregory et al. 2008).

Cell type specific TSS and sRNA-mediated cleavage events contribute to the diversification of cellular transcriptomes and thus can impact cellular differentiation (Miyashima et al. 2013; Zhou et al. 2015; Knauer et al. 2013; Carlsbecker et al. 2010; Kidner and Martienssen 2004; Williams et al. 2005; Karlsson et al. 2017). However, due to technical limitations, RNA 5' ends have traditionally been profiled on whole organisms or tissues composed of multiple cell types, and thus RNA 5' ends that exist in specific cell types will be depleted in the corresponding final datasets. Recently, methods have been developed to profile TSS from the low amounts of RNA obtainable from specific cell types and individual cells (Arguel et al. 2017; Islam et al. 2011; Cole et al. 2018; Karlsson et al. 2017). However, it remains a challenge to identify and confidently assign bona fide TSS to their corresponding genes due to technical limitations (Cocquet et al. 2006; Tang et al. 2012). Moreover, PARE methods require input RNA levels that are typically only obtainable from bulk tissues and thus are limited in their application to specific cell types.

Diverse RNA 5' ends are generated through both transcriptional and post-transcriptional processes. These important modes of gene regulation often vary across cell types, and can contribute to the diversification of transcriptomes and thus cellular differentiation. Therefore, the identification of primary and processed 5' ends of RNAs is important for their functional characterization. Methods have been developed to profile either RNA 5' ends from primary transcripts or the products of RNA degradation genome-wide. However, these approaches require either high amounts of starting RNA or are performed in the absence of paired gene-body mRNA-Seq data. These requirements limit current efforts in RNA 5' end annotation to whole tissues and can prevent accurate RNA 5' end classification due to biases in the datasets.

There is a clear need for accurate identification and precise classification of RNA 5'end from standard and low-input RNA.

SUMMARY OF THE INVENTION

It is an objective of the present invention to provide a method for enabling the accurate identification and precise classification of RNA 5' ends from standard and low-input RNA.

The objective is solved by the present invention.

According to the invention, a next-generation sequencing based method called nanoPARE (parallel analysis of RNA ends from low-input RNA) and associated software are provided. NanoPARE can be used for the genome-wide detection of RNA 5' ends from low amounts of total RNA including those from specific cell types. nanoPARE's integrative approach of combining RNA 5'-end enrichment and full-length Smart-seq2 datasets from the same sample can specifically be used for the genome-wide characterization of biological RNA 5' end diversity in rare tissue and individual cell types.

By integrating RNA 5' end information from nanoPARE with gene-body mRNA-sequence data from the same RNA sample, the inventive method enables the identification of transcription start sites at single-nucleotide resolution from single-cell levels of total RNA, as well as small RNA-mediated cleavage events from at least 10,000-fold less total RNA compared to conventional approaches such as PARE.

For accurate classification of RNA 5' ends generated during transcriptional and post-transcriptional processes from nanoPARE data EndGraph and EndCut software were further developed. EndGraph distinguishes 5' RNA ends corresponding to $m^7G$-capped or noncapped RNAs. To circumvent the limitations of correctly assigning sequences from capped RNA ends (i.e. TSS) to their corresponding genes, EndGraph integrates sequence information at RNA 5' ends from nanoPARE with transcript body sequences generated by a commonly used Smart-seq2 protocol (Picelli et al. 2013). Such an integrated approach allows the precise mapping of TSS at single-nucleotide resolution from down to single-cell levels of total RNA ($\geq 10$ picogram (pg)), as well as noncapped RNA 5' ends from as low as 1 nanogram (ng) of total RNA. NanoPARE accurately identifies RNA 5' ends from low amounts of total RNA and can also be used for the genome-wide characterization of transcriptional and post-transcriptional RNA regulatory mechanisms that operate in specific cell types. Therefore, nanoPARE can be used to accurately profile transcription start sites, noncapped RNA 5' ends and small RNA targeting events from individual cell types and can further be used for dissecting cell type specific transcriptional and post-transcriptional RNA regulatory mechanisms.

The present invention further enables the generation of multiple sequencing libraries from a single full-length cDNA library and/or a gene body cDNA library.

According to an embodiment of the invention, herein provided is a method for generating multiple sequencing libraries from a single full-length cDNA library, specifically an RNA 5' end sequencing library and/or a gene body cDNA library, comprising the sequential steps of:

a) generation of a full-length cDNA library through template switching reverse transcription with template switching oligonucleotides (TSO),
b) isometric PCR amplification of a first strand cDNA from said full-length cDNA library into double-stranded (ds) cDNA,
c) fragmentation of said ds cDNA to generate ds cDNA fragments,
d) ligation of bridge PCR compatible forward and reverse adapters to said ds cDNA fragments to generate a pool of ds cDNA fragments,
e) wherein steps c) and d) are preferably performed in the same step by tagmentation of the ds cDNA fragments and
f) separation of the pool of ds cDNA fragments into two aliquots wherein
(i) one aliquot is amplified using primers complementary to the sequences of the forward and reverse adapters added in d) to generate a sequencing compatible cDNA library of ds cDNA body reads and
(ii) the second aliquot is again split into two sub-aliquots, wherein
the first sub aliquot is amplified using a primer matching the template-switching oligo sequence and a primer matching the sequence of the forward adapter added in d) and
the second sub-aliquot is amplified using a primer matching the template-switching oligo sequence and a primer matching the sequence of the reverse adapter added in d)
to generate a sequencing compatible 5' end library from said sub-aliquots.

According to a further embodiment of the invention, herein provided is a method for analyzing RNA 5' ends comprising the steps of:

a) generation of a full-length cDNA library through template switching reverse transcription with template switching oligonucleotides (TSO),
b) isometric PCR amplification of a first strand cDNA from said full-length cDNA library into double-stranded (ds) cDNA,
c) fragmentation of said double stranded cDNA to generate ds cDNA fragments,
d) ligation of bridge PCR compatible forward and reverse adapters to said ds cDNA fragments to generate a pool of ds cDNA fragments,
e) wherein steps c) and d) are preferably performed in the same step by tagmentation of the ds cDNA fragments and
f) separation of the pool of ds cDNA fragments into two aliquots wherein
(i) one aliquot is amplified using primers complementary to the sequences of the forward and reverse adapters added in d) to generate a sequencing compatible cDNA library of ds cDNA body reads and
(ii) the second aliquot is again split into two sub-aliquots, wherein
the first sub aliquot is amplified using a primer matching the template-switching oligo sequence and a primer matching the sequence of the forward adapter added in d) and
the second sub-aliquot is amplified using a primer matching the template-switching oligo sequence and a primer matching the sequence of the reverse adapter added in d),
g) sequencing of said compatible 5' end library with a custom forward sequencing primer matching the TSO and
h) sequencing compatible cDNA library using standard sequencing primers to obtain sequencing data.

According to a specific embodiment of the invention, consensus RNA 5' ends are identified by applying a computational method comparing the sequencing data, specifically using subtractive kernel density estimation.

According to a further embodiment, 7 methylguanosine (m7G) capped and non-m7G capped 5' end features are simultaneously identified through the presence of one or more untemplated guanosines.

Specifically, non-m7G capped 5' RNA end structures are identified from less than 5 µg of RNA, specifically from 1-5 ng of RNA.

According to a specific embodiment, labels of randomized nucleotides are added when the full-length cDNA library is generated to allow single molecule quantification of 5' RNA ends.

Specifically, 5' RNA adapter ligation is performed before generating the full-length cDNA library to generate a further aliquot used for identifying 5'P containing RNAs.

Specifically, 3' RNA adapter ligation is performed before generating the full-length cDNA library to generate a further aliquot used for identifying non-poly(A) RNAs.

Specifically, a size selection step is performed after isometric PCR amplification of the first strand cDNA to generate a further library for identifying small RNAs.

According to a specific embodiment of the invention, the method described herein is used in statistical identification of 5' end small RNA cleavage products, comprising the steps of
- a) taking a set of 5' RNA end sequences not containing capped sequences and comparing said set to a set of small RNA sequences,
- b) generating a cohort of at least 1000 randomized RNAs corresponding to each small RNA sequence in the set such that each member of the small RNA sequences of said cohort has the same nucleotide composition as the small RNA sequences the cohort is generated from,
- c) deriving a score for each RNA in the cohort based on an analysis of its base pairing strength to each position in a reference transcriptome, preferentially in a transcriptome derived from the cDNA body library,
- d) comparing each position in the transcriptome with a sufficiently high base pairing strength calculated in c) to the RNA 5' end structures not containing capped structures, specifically, the 5' end base pairing signal at a site of interest is measured as a fold change relative to the highest observed 5' end base pairing signal in a window of fixed distance around the site of interest and
- e) calculating a statistical likelihood of observing a given small RNA cleavage product by combining the observed likelihoods against the cohort for both base pairing strengths from c) and the 5' end fold change in d), wherein statistically significant combinations are indicating a small RNA cleavage site.

Specifically, the method is used for identifying capped and non-capped RNA 5'-end structures.

Specifically, the method is used for functional characterization of RNA molecules, specifically for functional characterization of RNA molecules from single-cell levels and rare tissues.

Specifically, the method is used for profiling sRNA-mediated cleavage events from low-input RNA, specifically from RNA from selected cells or cell types.

Further provided herein is a cDNA library, specifically an RNA 5' end sequencing library, enriched with
- cDNA fragments comprising a primer matching a template-switching oligo sequence and a forward adapter sequence primer and
- cDNA fragments comprising a primer matching a template-switching oligo sequence and a reverse adapter primer.

Specifically, the template-switching oligo sequence of the cDNA library described herein comprises one of more untemplated guanosines.

FIGURES

FIG. 1. Workflow of nanoPARE and EndGraph. (A) Diagram of the nanoPARE protocol, which enables construction of a stranded 5' end library (left) in parallel with a non-stranded transcript body library (Smart-seq2, Picelli et al. 2013), from the same RNA sample. (B) Diagram of the nanoPARE data analysis pipelines (i.e. EndGraph and EndCut) for identifying distinct capped and noncapped 5' end features from a paired nanoPARE and Smart-seq2 sequencing library.

Figure 2:
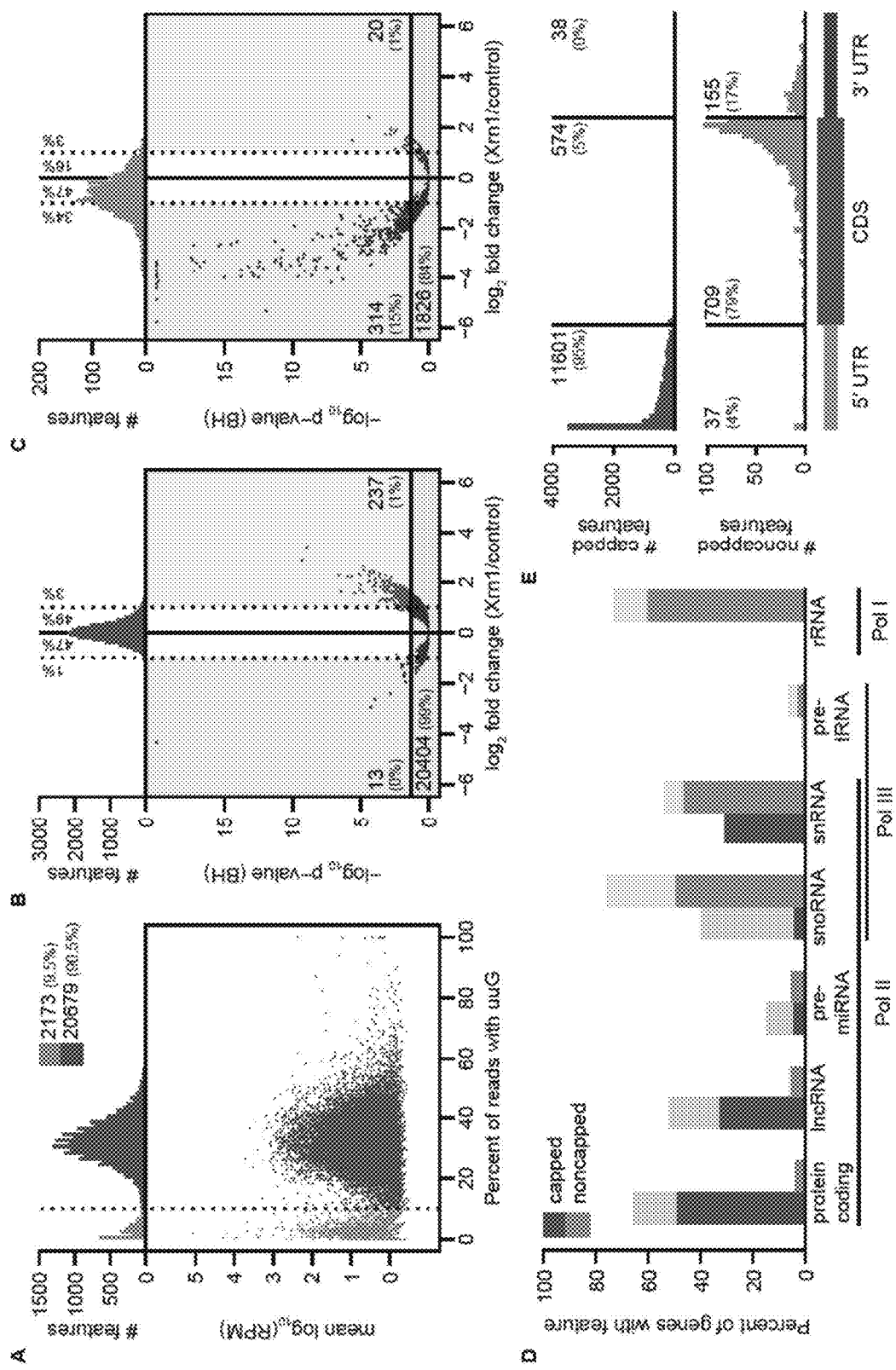

FIG. 2. Identification of capped and noncapped 5' end features with EndGraph. (A) RNA 5' end features identified from 5 ng of floral bud total RNA, distributed by the proportion of nanoPARE reads containing an upstream untemplated guanosine (uuG). The vertical line separates putative noncapped features (low-uuG, light grey) from putative capped features (high-uuG, dark grey). (B) Volcano plot of the change in read abundance for putative capped features after digestion with Xrn1 exonuclease. Barplots depict the distribution of all capped features by fold change versus control. Dotted lines delimit a two-fold change in feature abundance. $Log_2$ fold change and Benjamini-Hochberg adjusted p-values (BH) were calculated by DEseq2. Horizontal line demarcates an adjusted p-value of 0.05. (C) Volcano plot as in (B) for putative noncapped features. (D) Capped and noncapped features overlapping TAIR10 genes classified by gene type. Lighter bars include features up to 500 nucleotides upstream of the annotation. (E) Positional distribution of capped (top) and noncapped (bottom) features that overlap protein-coding genes.

Figure 3:
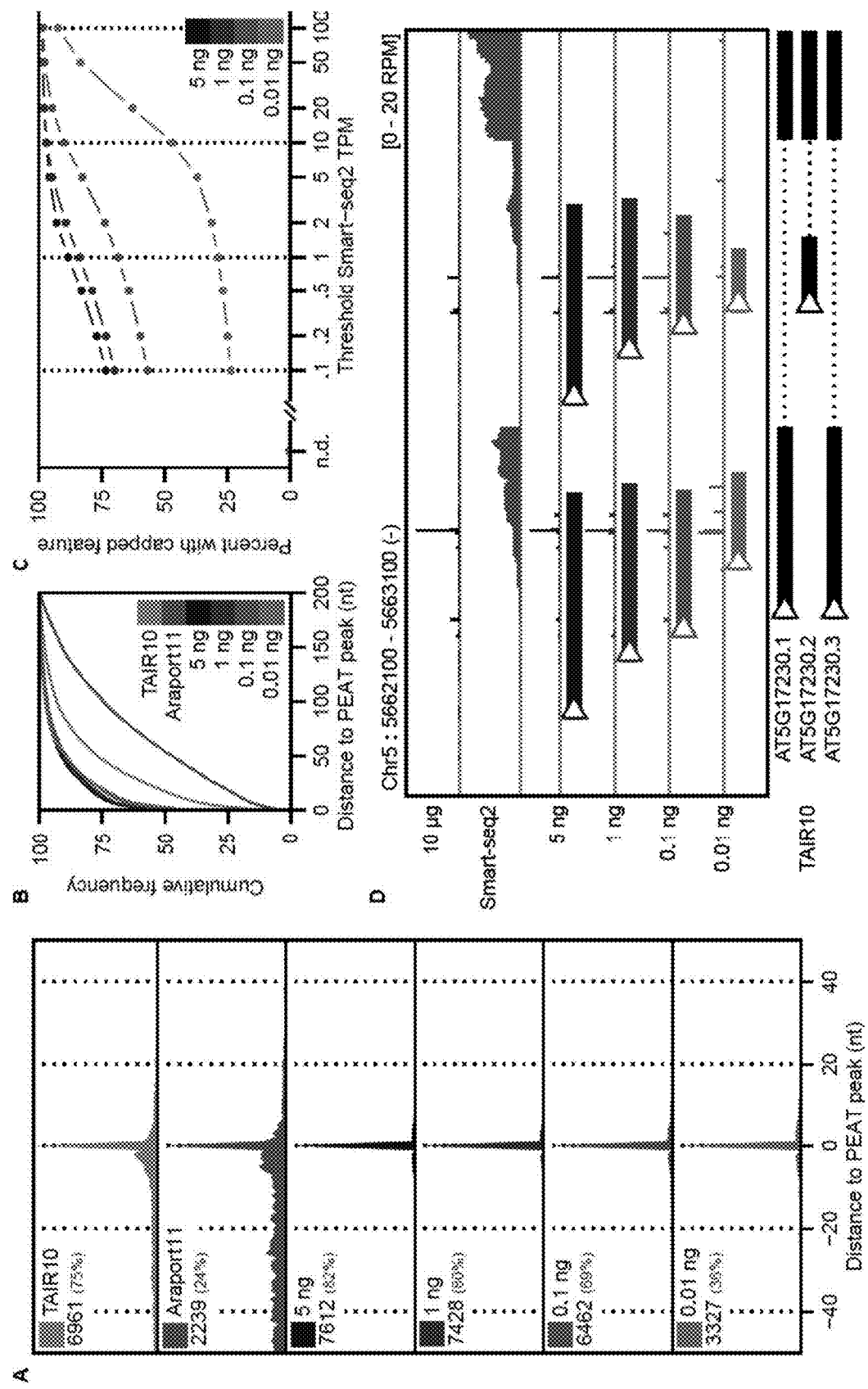

FIG. 3. Sensitive low-input transcription start site detection with nanoPARE. (A) Recall of capped peaks identified with PEAT (Morton et al. 2014) in two Arabidopsis reference annotations (TAIR10 and Araport11) and in nanoPARE features detected from a dilution series of total RNA input. Numbers indicate how many PEAT peaks have a 5' end feature within 50 bp in the test dataset. (B) Cumulative frequency distribution of positional error for all 5' features within 200 nt of a PEAT peak. (C) Sensitivity of nanoPARE in detecting capped 5' features for nuclear protein-coding genes as a function of their abundance measured by Smartseq2. Points indicate the percent of transcripts above the given threshold abundance (in transcripts per million, TPM) that contain a capped feature identified in at least 2 of 3 biological replicates. (D) Integrated Genomics Viewer (IGV) browser image of nanoPARE reads from the dilution series mapping to two transcription start sites of the PSY locus. Y-axis shows mean reads per million (RPM) across three biological replicates for each dilution. Solid bars mark capped features identified by EndGraph in each dilution.

Figure 4:
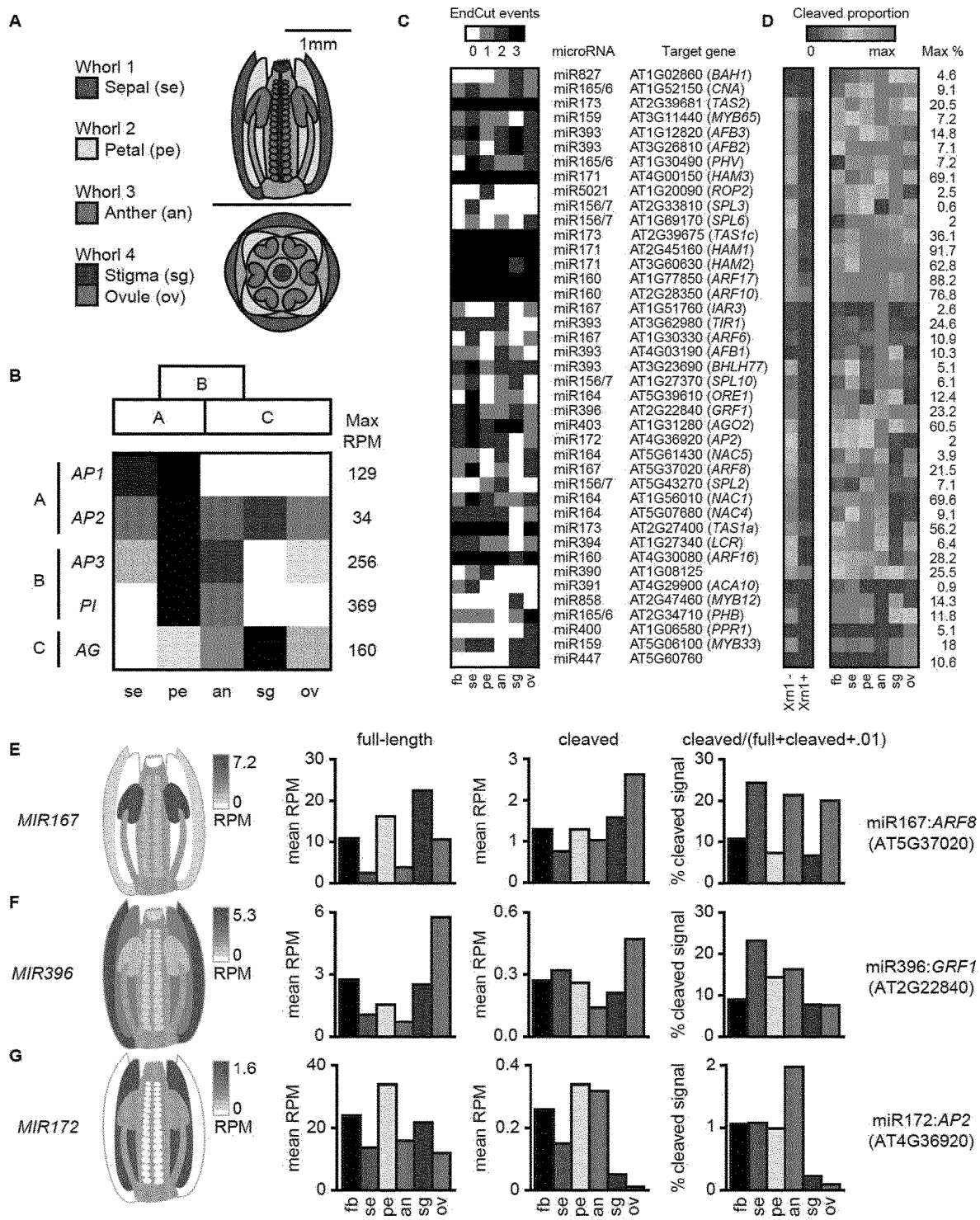

FIG. 4. Tissue-specific miRNA-target interactions with nanoPARE. (A) Diagrams of a longitudinal section (top) and cross-section (bottom) of an Arabidopsis flower at the onset of anthesis. Tissue types isolated for nanoPARE libraries are color-coded as shown. (B) Relative expression of the five ABC model homeotic genes across the five tissue types in panel A. Each row is scaled from zero to the maximum observed reads per million of a gene's capped feature. Expected spatial distributions based on the ABC model are shown as blocks above. (C, D) Heat maps of 41 high-confidence miRNA cleavage sites detected by nanoPARE in whole flowers (fb) and individual tissue types illustrating either the number of biological replicates in which the cleavage site was significantly detected (EndCut events) (C) or the proportion of cleaved signal to total full-length and cleaved signal (D). Each row is scaled to the maximum proportion observed for that interaction, which is indicated on the right. (E-G) (Left) Heat maps of the summed primary transcript levels for three families of miRNA genes in flowers as measured by nanoPARE. Floral tissues match those labeled in panel A. (Right) Bar charts depicting the relative abundance of full-length RNA, truncated RNA with a 5' end matching the miRNA cleavage site, and the proportion of cleaved RNA to the total cleaved and full-length signal, for the most strongly cleaved target of each of the three miRNA families to the left

DETAILED DESCRIPTION

Unless indicated or defined otherwise, all terms used herein have their usual meaning in the art, which will be clear to the skilled person. Reference is for example made to standard handbooks, such as Sambrook et al, "Molecular Cloning: A Laboratory Manual" (2nd Ed.), Vols. 1-3, Cold Spring Harbor Laboratory Press (1989); Lewin, "Genes IV", Oxford University Press, New York, (1990), and Janeway et al, "Immunobiology" (5th Ed., or more recent editions, Garland Science, New York, 2001).

The subject matter of the claims specifically refers to artificial products or methods employing or producing such artificial products, which may be variants of native (wild-type) products. Though there can be a certain degree of sequence identity to the native structure, it is well understood that the materials, methods and uses of the invention, e.g., specifically referring to isolated nucleic acid sequences, amino acid sequences, fusion constructs, expression constructs, transformed host cells and modified proteins including enzymes, are "man-made" or synthetic, and are therefore not considered as a result of "laws of nature".

The terms "comprise", "contain", "have" and "include" as used herein can be used synonymously and shall be understood as an open definition, allowing further members or parts or elements. "Consisting" is considered as a closest definition without further elements of the consisting definition feature. Thus "comprising" is broader and contains the "consisting" definition.

The term "about" as used herein refers to the same value or a value differing by +/−5% of the given value.

Identification of RNA 5'ends generated via transcription and post-transcription is a valuable tool for functionally characterizing RNA molecules.

A "molecule" as used herein refers to a single entity or particle made up of atoms by covalent bonds. The molecule can comprise different parts, which are made up of one single class of substances or a combination thereof. Herein, specifically RNA is referred to, optionally with chemical modifications. The molecule may be of varying length, size or molecular weight, and can have any activity known and/or desired by the skilled person.

Specifically, the term "nucleic acid molecule", as used herein, is intended to include RNA molecules, DNA molecules, cDNA molecules, oligonucleotides, polynucleotides and analogs or derivatives thereof. The term includes synthetic nucleic acid molecules, such as chemically synthesized, chemically modified or recombinantly produced nucleic acid molecules. Suitable nucleic acid molecules are RNA molecules, including any small RNA but not limited thereto, for example mRNA, rRNA, pre-microRNAs, siRNA, tasiRNA, snRNA, miRNA, snoRNA, piRNA, and tRNA.

The method described herein can be specifically applied to the identification of a broad spectrum of RNA 5' ends from RNAs as described above, including capped TSS and noncapped processed RNA intermediates such as snoRNAs, snRNAs, rRNAs and pre-microRNAs.

The term "sequencing," as used herein, generally refers to methods and technologies for determining the sequence of nucleotide bases in one or more polynucleotides. The polynucleotides can be, for example, deoxyribonucleic acid (DNA) or ribonucleic acid (RNA), including variants or derivatives thereof (e.g., single stranded DNA). Sequencing can be performed by various systems currently available, specifically next generation sequencing, such as, but not limited to sequencing systems by Illumina, Pacific Biosciences, Oxford Nanopore, or Life Technologies (Ion Torrent).

A "sequencing library" as used herein refers to a collection or pool of RNA fragments for sequencing. Said library is made by starting from cDNA libraries, specifically from full-length cDNA libraries, specifically RNA 5'end sequencing libraries and gene body cDNA libraries. The term "gene body cDNA library" refers to a cDNA library derived from the 3'polyadenylated (poly(A)) RNA library or sample of a eukaryotic organism, containing the transcribed portion of the genome of a eukaryotic organism.

Samples and libraries as referred herein are originating from eukaryotic organisms, such as plants and animals and can be, but are not limited to, cells, cell cultures, cell fragments, cell compartments, tissues etc.

The term "primer," as used herein generally refers to a strand of RNA or DNA that serves as a starting point for nucleic acid (e.g., DNA) synthesis. A primer may be used in a primer extension reaction, which may be a nucleic acid amplification reaction, such as, for example, polymerase chain reaction (PCR) or reverse transcription PCR (RT-PCR). The primer may have a sequence that is capable of coupling to a nucleic acid molecule. Such sequence may be complementary to the nucleic acid molecule, such as a poly-T sequence or a predetermined sequence, or a sequence that is otherwise capable of coupling (e.g., hybridizing) to the nucleic acid molecule, such as a universal primer.

A primer binding site is a region of a nucleotide sequence where an RNA or DNA single-stranded primer binds to start replication. The primer binding site is on one of the two complementary strands of a double-stranded nucleotide polymer, in the strand which is to be copied, or is within a single-stranded nucleotide polymer sequence.

A PCR primer binding site is a site where a polymerase chain reaction (PCR) primer binds, to prime duplication of a complement to an existing DNA or RNA sequence.

The term "nanoPARE" refers to the parallel analysis of RNA 5'ends from low-input RNA, said method being described herein. Specifically, cDNA and RNA libraries can be generated by the method, wherein the total RNA used as starting material is present in a sample in an amount of ≤5 ng, ≤4 ng, ≤3 ng, ≤2 ng, ≤1 ng, specifically ≤900 pg, ≤800 pg, ≤700 pg, ≤600 pg, ≤500 pg, ≤400 pg, ≤300 pg, ≤200 pg, ≤100 pg, ≤90 pg, ≤80 pg, ≤70 pg, ≤60 pg ≤50 pg, ≤40 pg, ≤30 pg, ≤20 pg, ≤10 pg. 10 pg total RNA is the approximate amount of RNA in a single cell. Thereby, the nanoPARE method of the invention allows detection of RNA amounts even at the level of single cells and can be used to accurately profile transcription start sites, noncapped RNA 5' ends and small RNA targeting events from individual cells, cell types and rare tissues such as plant embryos. NanoPARE libraries can be processed in parallel with a full-length RNA sequencing library from the same cDNA, therefore this full-length library can act as a background model that contains an identical set of technical biases.

The method described herein comprises following sequential steps:

a) A full-length cDNA library is generated through template switching reverse transcription with template switching oligonucleotides (TSO).

A template-switching reverse transcription reaction will generally involve a template nucleic acid from which a double stranded cDNA is generated. Sources and/or methods of generating template nucleic acids can vary. Template nucleic acids may be present in a template nucleic acid composition or a biological sample (e.g., a sample obtained from or containing a living organism and/or living cells or tissues). It can be used for the accurate detection of transcription start sites and other types of RNA 5' ends. Specifically, reverse transcription/template switching reactions add primer binding sites for subsequent amplifications.

TSOs are oligonucleotide sequences that hybridize to untemplated C nucleotides added by a reverse transcriptase during reverse transcription. Specifically, TSOs have a length of about 10 to about 50 nucleotides, specifically from 15 to 45 nucleotides, specifically from 20 to 40 nucleotides, specifically about 30 nucleotides. The TSO adds a common 5' sequence to full-length cDNA that is used for downstream cDNA amplification. Accurate quantification of individual transcripts or identification of unknown transcription start sites requires an efficient approach to convert mRNA molecules into full-length cDNA. However, conventional cDNA construction methods usually result in an underrepresentation of the 5' ends of cDNA. For example, the smart-seq2 technology well known by the skilled person is used wherein single cells are lysed in a buffer that contains free dNTPs and oligo(dT)-tailed oligonucleotides with a universal 5'-anchor sequence. Reverse transcription is performed, which adds 2-5 untemplated nucleotides to the cDNA 3' end. A template-switching oligo (TSO) is added, carrying two riboguanosines and a modified guanosine to produce a locked nucleic acid (LNA) as the last base at the 3' end.

b) Isometric PCR amplification of a first strand cDNA from said full-length cDNA library into double-stranded (ds) cDNA is performed, optionally said amplification is using a limited number of cycles.

For "isometric PCR amplification", the same primer binding site is added to both ends of the cDNA, and these are used for PCR amplification. As an example, adapter and primer sequences for Next Generation Sequencing are used therefor.

c) The double stranded cDNA of step b) is fragmented to generate ds cDNA fragments. Specifically, said fragments can be in the range of 50 to 500 nt length, specifically in the range of 100 to 400 nt, specifically said fragments can be of about 500 nt length, specifically of about 400, 300, 200 or about 100 nt or less than 100 nt.

d) Bridge PCR compatible forward and reverse adapters are ligated to the ds cDNA of step c) fragments to generate a pool of ds cDNA fragments.

Bridge PCR is also referred to as bridge amplification and is used to generate clusters on the flow cell. The technology is well known to the skilled person and is provided commercially, such as by Illumin (Illumina HiSEQ™). The flow cell has oligonucleotides that are complementary to P5 and P7 oligos and when libraries are loaded they will bind and then after primer extensions will bend over and the other end will bind to other complementary oligo and make a "bridge", which can be used for amplification similar to PCR.

e) Steps c) and d) are preferably performed in the same step by tagmentation of the ds cDNA fragments.

Tagmentation refers to a method to quickly and efficiently construct sequencing libraries from amplified cDNA. Tagmentation can be performed with one or more transposases. The one or more transposases cut to double-stranded DNA and can concurrently ligate the linker sequences that are required for sequencing to both ends.

A "transposase" means an enzyme that is capable of forming a functional complex with a transposon end domain-containing composition (e.g., transposons, transposon ends, transposon end compositions) and catalyzing insertion or transposition of the transposon end-containing composition into the double-stranded target DNA with which it is incubated in an in vitro transposition reaction. Transposases that find use in practicing the methods of the present method include, but are not limited to, Tn5 transposases, Tn7 transposases, and Mu transposases. The transposase may be a wild-type transposase. In other aspects, the transposase includes one or more modifications (e.g., amino acid substitutions) to improve a property of the transposase, e.g., enhance the activity of the transposase. For example, hyperactive mutants of the Tn5 transposase having substitution mutations in the Tn5 protein (e.g., E54K, M56A and L372P) have been developed and are described in, e.g., Picelli et al. (2013) Additional Tn5 substitution mutations include, but are not limited to: Y41H; T47P; E54V, E110K, P242A, E344A, and E345A. A given Tn5 mutant may include one or more substitutions, where combinations of substitutions that may be present include, but are not limited to: T47P, M56A and L372P; TT47P, M56A, P242A and L372P; and M56A, E344A and L372P.

Transcript body sequences and transcriptome libraries could be from single cells and single cell-types. The method described herein enables determination of transcription start sites from single-cell levels of total RNA. It can also determine small RNA directed cleavage sites from single cell-type levels.

The term "body reads" are essentially standard RNA-seq reads that map to transcripts. Body reads are different from 5' end reads that are generated by NanoPARE, the method described herein.

f) The pool of ds cDNA fragments is separated into two aliquots wherein
   (i) one aliquot is amplified using primers complementary to the sequences of the forward and reverse adapters added in d) to generate a sequencing compatible cDNA library of ds cDNA fragments and
   (ii) the second aliquot is again split into two sub-aliquots, wherein
      the first sub aliquot is amplified using a primer matching the template-switching oligo sequence and a primer matching the sequence of the forward adapter added in d) and
      the second sub-aliquot is amplified using a primer matching the template-switching oligo sequence and a primer matching the sequence of the reverse adapter added in d)
   to generate a sequencing compatible 5' end library from said sub-aliquots.

The method described herein can also be used for analyzing RNA 5' ends comprising the steps a) to f) as described above and further comprising the steps
   g) sequencing of said compatible 5' end library with a custom forward sequencing primer matching the TSO and
   h) sequencing the compatible cDNA library using standard sequencing primers to obtain sequencing data.

The method described herein allows identification of consensus RNA 5' ends by applying a computational method comparing the sequencing data, specifically using subtractive kernel density estimation.

The sequencing data can the be further processed through the EndMap, EndCap, etc. modules of the nanoPARE software as described below.

Kernel density estimation (KDE) is a non-parametric way to estimate the probability density function of a random variable. Kernel density estimation is a fundamental data smoothing problem where inferences about the population are made, based on a finite data sample. Five-prime cap (5' cap) is a specially altered nucleotide on the 5' end of some primary transcripts such as precursor messenger RNA. This process, known as mRNA capping, is highly regulated and vital in the creation of stable and mature messenger RNA able to undergo translation during protein synthesis. Mitochondrial mRNA and chloroplastic mRNA are not capped. In eukaryotes, the 5' cap, found on the 5' end of an mRNA molecule, consists of a guanine nucleotide connected to mRNA via an unusual 5' to 5' triphosphate linkage. This guanosine is methylated on the 7 position directly after capping in vivo by a methyltransferase. It is referred to as a 7-methylguosine cap, abbreviated $m^7G$. In multicellular eukaryotes and some viruses, further modifications exist, including the methylation of the 2' hydroxy-groups of the first 2 ribose sugars of the 5' end of the mRNA. cap-1 has a methylated 2'-hydroxy group on the first ribose sugar, while cap-2 has methylated 2'-hydroxy groups on the first two ribose sugars, shown on the right. The 5' cap is chemically similar to the 3' end of an RNA molecule (the 5' carbon of the cap ribose is bonded, and the 3' unbonded). This provides significant resistance to 5' exonucleases. Small nuclear RNAs contain unique 5'-caps. Sm-class snRNAs are found with 5'-trimethylguanosine caps, while Lsm-class snRNAs are found with 5'-monomethylphosphate caps. In bacteria, and potentially also in higher organisms, some RNAs are capped with $NAD^+$, NADH, or 3'-dephospho-coenzyme A. In all organisms, mRNA molecules can be decapped in a process known as messenger RNA decapping.

The method also allows simultaneous identification of different populations of RNA molecules in a sample, which are high-uuG "capped" RNAs which contain a 7 methylguanosine (m7G) cap and low-uuG "non-capped", i.e. non-m7G capped, 5' end RNA molecules through the presence of one or more untemplated guanosines.

Specifically, non-m7G capped 5' RNA end structures are identified from less than 5 µg of RNA, specifically from 1-5 ng of RNA.

In a specific embodiment, randomized nucleotides can be added when the full-length cDNA library is generated to allow single molecule quantification of 5' RNA ends.

Specifically, said randomized nucleotides are unique molecular identifiers (UMIs), or molecular barcodes (MBC), which are short sequences or molecular "tags" added to cDNA fragments to identify the input cDNA molecule. They can be used to reduce errors and quantitative bias introduced by amplification.

Unique molecular identifiers (UMI) can also be used to detect and quantify unique mRNA transcripts. As an example, cDNA libraries can be generated by reverse-transcription as described above but using template-switching oligonucleotides with randomized sequences (of about 6-10 nucleotides) inserted just upstream of the terminal Gs with LNA modifications. The cDNAs are processed otherwise as described above and UMI sequences can be used to count the unique number of molecules detected and allow for more accurate measurements of true variants.

Specifically, 5' RNA adapter ligation can be performed before generating the full-length cDNA library to generate a further aliquot used for identifying 5'phosphorylated RNAs.

Thereby, non-capped RNA's can be enriched, including cleavage products, thereby getting insight to cellular events due to RNA processing events.

Specifically, 3' RNA adapter ligation can be performed before generating the full-length cDNA library to generate a further aliquot used for identifying non-poly(A) RNAs.

Specifically, a size selection step can be performed after isometric PCR amplification of the first strand cDNA to generate a further library for identifying small RNAs.

The method described herein can be also used in statistical identification of 5' end small RNA cleavage products, comprising the steps of
a) taking a set of 5' RNA end sequences not containing capped sequences and comparing said set to a set of small RNA sequences,
b) generating a cohort of at least 1000 randomized RNAs corresponding to each small RNA sequence in the set such that each member of the small RNA sequences of said cohort has the same nucleotide composition as the small RNA sequences the cohort is generated from,
c) deriving a score for each RNA in the cohort based on an analysis of its base pairing strength to each position in a reference transcriptome, preferentially in a transcriptome derived from the cDNA body library generated from an aliquot of the same cDNA used to generate the nanoPARE library,
d) comparing each position in the transcriptome with a sufficiently high base pairing strength calculated in c) to the RNA 5' end structures not containing capped structures, specifically, the 5' end base pairing signal at a site of interest is measured as a fold change relative to the highest observed 5' end base pairing signal in a window of fixed distance around the site of interest and
e) calculating a statistical likelihood of observing a given small RNA cleavage product by combining the observed likelihoods against the cohort for both base pairing strengths from c) and the 5' end fold change in d), wherein statistically significant combinations are indicating a small RNA cleavage site.

The term "transcriptome" refers to the sum total of all the mRNA molecules expressed from the genes of an organism.

Specifically, the method can be used for identifying capped and non-capped RNA 5'-end structures and for functional characterization of RNA molecules, specifically for functional characterization of RNA molecules from single-cell levels.

Specifically, the method is used for profiling sRNA-mediated cleavage events from low-input RNA, specifically from RNA from selected cells or cell types.

Further provided herein is a cDNA library, specifically an RNA 5' end sequencing library, enriched with
cDNA fragments comprising a primer matching a template-switching oligo sequence and a forward adapter sequence primer and
cDNA fragments comprising a primer matching a template-switching oligo sequence and a reverse adapter primer.

Specifically, the template-switching oligo sequence of the cDNA library described herein comprises one of more untemplated guanosines.

As used herein, the terms "nucleic acid", "polynucleotide", and "polynucleic acid" can be used interchangeably and refer to a polymeric form of nucleotides of any length, either ribonucleotides, deoxyribonucleotides, chemically modified forms or analogs of nucleotides, and combinations of the foregoing. A nucleic acid can be exogenous or endogenous to a cell. A nucleic acid can exist in a cell-free environment. A nucleic acid can be a gene or fragment thereof. A nucleic acid can be DNA. A nucleic acid can be RNA. A nucleic acid can comprise one or more analogs (e.g. altered backbone, sugar, or nucleobase). Some non-limiting examples of analogs include: 5-bromouracil, peptide nucleic acid, xeno nucleic acid, morpholinos, locked nucleic acids, glycol nucleic acids, threose nucleic acids, dideoxynucleotides, cordycepin, 7-deaza-GTP, fluorophores (e.g. rhodamine or fluorescein linked to the sugar), thiol containing nucleotides, biotin linked nucleotides, fluorescent base analogs, CpG islands, methyl-7-guanosine, methylated nucleotides, inosine, thiouridine, pseudourdine, dihydrouridine, queuosine, and wyosine. A single-stranded nucleic acid can also be one strand nucleic acid of a denatured double-stranded DNA. Alternatively, it can be a single-stranded nucleic acid not derived from any double-stranded DNA. In one aspect, the template nucleic acid is RNA. In another aspect, the template is DNA. The term includes sense and anti-sense strands of RNA, cDNA, genomic DNA, synthetic forms and mixed polymers thereof. The term also includes any topological conformation, including single-stranded (ss) and double stranded (ds) conformations.

A nucleic acid can comprise one or more modifications (e.g., a base modification, a backbone modification), to provide the nucleic acid with a new or enhanced feature (e.g., improved stability). A nucleic acid can comprise a nucleic acid affinity tag. A nucleoside can be a base-sugar combination. The base portion of the nucleoside can be a heterocyclic base. The two most common classes of such heterocyclic bases are the purines and the pyrimidines.

Nucleotides can be nucleosides that further include a phosphate group covalently linked to the sugar portion of the nucleoside. For those nucleosides that include a pentofuranosyl sugar, the phosphate group can be linked to the 2', the 3', or the 5' hydroxyl moiety of the sugar. In forming nucleic acids, the phosphate groups can covalently link adjacent nucleosides to one another to form a linear polymeric compound. Within nucleic acids, the phosphate groups can commonly be referred to as forming the internucleoside backbone of the nucleic acid. The linkage or backbone of the nucleic acid can be a 3' to 5' phosphodiester linkage. A nucleic acid can comprise a modified backbone and/or modified internucleoside linkages. Modified backbones can include those that retain a phosphorus atom in the backbone and those that do not have a phosphorus atom in the backbone. Suitable modified nucleic acid backbones containing a phosphorus atom therein can include, for example, phosphorothioates, chiral phosphorothioates, phosphorodithioates, phosphotriesters, aminoalkylphospho-triesters, methyl and other alkyl phosphonates such as 3'-alkylene phosphonates, 5'-alkylene phosphonates, chiral phosphonates, phosphinates, phosphoramidates including 3'-amino phosphoramidate and aminoalkyl-phosphoramidates, phosphoro-diamidates, thionophosphoramidates, thionoalkylphosphonates, thionoalkylphospho-triesters, selenophosphates, and boranophosphates having normal 3'-5' linkages, 2'-5' linked analogs, and those having inverted polarity wherein one or more internucleotide linkages is a 3' to 3', a 5' to 5' or a 2' to 2' linkage.

A nucleic acid can comprise polynucleotide backbones that are formed by short chain alkyl or cycloalkyl internucleoside linkages, mixed heteroatom and alkyl or cycloalkyl internucleoside linkages, or one or more short chain heteroatomic or heterocyclic internucleoside linkages. These can include those having morpholino linkages (formed in part from the sugar portion of a nucleoside); siloxane backbones; sulfide, sulfoxide and sulfone backbones; formacetyl and thioformacetyl backbones; methylene formacetyl and thioformacetyl backbones; riboacetyl backbones; alkene containing backbones; sulfamate backbones; methyleneimino and methylenehydrazino backbones; sulfonate and sulfonamide backbones; amide backbones; and others having mixed N, O, S and $CH_2$ component parts.

A nucleic acid can also include nucleobase (often referred to simply as "base") modifications or substitutions. As used herein, nucleobases include the purine bases, (e.g. adenine (A) and guanine (G)), and the pyrimidine bases, (e.g. thymine (T), cytosine (C) and uracil (U)).

The examples described herein are illustrative of the present invention and are not intended to be limitations thereon. Different embodiments of the present invention have been described according to the present invention. Many modifications and variations may be made to the techniques described and illustrated herein without departing from the spirit and scope of the invention. Accordingly, it should be understood that the examples are illustrative only and are not limiting upon the scope of the invention.

EXAMPLES

Example 1

RNA 5' End Enrichment from Low-Input RNA Samples

To generate libraries of sequences at the 5' ends of polyadenylated transcripts, a PCR-based method was developed, which is referred to as nanoPARE, to select for sequences corresponding to the 5' ends of cDNAs generated by the Smart-seq2 single-cell mRNA-Seq method (Picelli et al. 2013) (FIG. 1A). Smart-seq2 utilizes the template-switching activity of group II intron reverse transcriptase to introduce a defined template-switching oligonucleotide sequence (TSO) at the 5'-end of the cDNA during first strand synthesis (Zhu et al. 2001; Clark 1988). Following PCR pre-amplification, cDNA was tagmented using a hyperactive Tn5 transposase which fragments cDNA and ligates adaptors that serve as oligo-anchoring sites for final library preparation. The hyperactive Tn5 allele carries the classical E54K and L372Pmutations but is wild type with respect to M56. (Ramsköld et al. 2012, Picelli S. et al., 2019).

FIG. 1 shows the workflow of nanoPARE and EndGraph. (A) Diagram of the nanoPARE protocol, which enables construction of a stranded 5' end library (left) in parallel with a non-stranded transcript body library (Smart-seq2, Picelli et al. 2013), from the same RNA sample. (B) Diagram of the nanoPARE data analysis pipelines (i.e. EndGraph and EndCut) for identifying distinct capped and noncapped 5' end features from a paired nanoPARE and Smart-seq2 sequencing library.

Then oligonucleotides corresponding to TSO were used and transposase adapter sequences were inserted to enrich for sequences from the 5' ends of the cDNAs. The resulting amplicons were then used for final PCR amplification with indexed Illumina-adapter primer for next generation sequencing. Because all steps prior to final NGS library preparation are identical to conventional Smart-seq2, both 5' end and full-length sequence information can be retrieved from the cDNA of a single sample. Importantly, by combining 5' end and full-length sequence information, RNA 5' ends can be precisely identified at single-nucleotide resolution as demonstrated below.

Identification of Capped and Noncapped 5' End Features

Template switching is used for the accurate detection of transcription start sites in protocols such as nanoCAGE, START-seq and more recently Tn5Prime, which have been shown to work efficiently on low-input samples, including single cells (Plessy et al. 2010; Islam et al. 2012; Cole et al. 2018). Template switching readily occurs at the 5' ends of RNA templates with or without 7-methylguanosine (m7G) cap structures (Cloonan et al. 2008; Harbers et al. 2013), and it has been used for efficient amplification of fragmented RNA in protocols such as the SMARTer® Universal Low Input RNA Kit (Takara). A substantial proportion of nanoCAGE reads map to gene bodies downstream of their transcription start sites (Plessy et al. 2010), and it was recently demonstrated that these libraries can detect the 3' cleavage products of primary microRNAs by Drosha, which possess a 5'-monophosphate (de Rie et al. 2017). Noncapped RNA 5' ends are generated by a wide variety of critical biological processes, including miRNA biogenesis, small RNA-mediated target cleavage, mRNA turnover by exonucleases, and maturation of other noncoding RNAs such as ribosomal, small nucleolar, and small nuclear RNAs (rRNA, snoRNA, and snRNA, respectively (Filipowicz and Pogacić 2002; Bartel 2004; Borges and Martienssen 2015; Granneman et al. 2011; Henras et al. 2015; Wang et al. 1988). Interest in detecting these events has led to the development of protocols that isolate and sequence RNA 5' ends with monophosphates, including PARE, degradome, 5P-seq and GMUCT (Addo-Quaye et al. 2008; German et al. 2008; Gregory et al. 2008; Pelechano et al. 2013). However, these methods all require at least 5 µg of total RNA, making them unsuitable for investigating dynamics of noncapped RNAs on a tissue- or cell-specific level. Additionally, these methods consume the RNA sample; therefore, the abundance of 5'-monophosphate RNAs cannot be assessed in the context of other RNAs derived from the same gene. Template switching could therefore be used to identify RNA 5' end features genome-wide regardless of their cap structure. However, spurious 5' ends could be produced by a variety of technical artefacts, including random fragmentation of RNA in vitro, stalling of the reverse transcriptase enzyme, PCR amplification bias, or "strand invasion" by the template-switching oligo (Cocquet et al. 2006; Tang et al. 2012), which make it impossible to distinguish genuine biological signal without an appropriate estimate of background noise. Because nanoPARE libraries can be processed in parallel with a full-length RNA sequencing library from the same cDNA, this full-length library can act as a background model that contains an identical set of technical biases. The data analysis pipeline EndGraph was designed on this principle. That is, a paired 5' end and gene body sequencing library are produced from the same sample, and significant 5' end features are identified against the gene body background model (see Methods).

EndGraph was applied to a paired collection of nanoPARE/Smart-seq2 libraries prepared from 5 ng of total RNA isolated from *Arabidopsis* floral buds in biological triplicate and reproducibly identified a total of 22,852 5'-end features from polyadenylated RNA in at least 2 of the 3 biological replicates. The template-switching reaction produces an additional guanosine in the cDNA between the TSO and the genome-matching sequence (Cumbie et al. 2015). These upstream untemplated guanosines (uuGs) can be used to filter 5'-end data produced by template-switching protocols and isolate 5'-capped transcription start sites (Cumbie et al. 2015). Indeed, uuG was consistently the most abundant untemplated upstream nucleotide in all nanoPARE libraries. The total proportion of reads was analysed in all 5'-end features that contained uuG, and a striking bimodal distribution could be observed, with most 5'-end features (20,679; 90.5%) containing >10% uuG reads (FIG. 2A).

FIG. 2 displays the identification of capped and noncapped 5' end features with EndGraph. (A) RNA 5' end features identified from 5 ng of floral bud total RNA, distributed by the proportion of nanoPARE reads containing an upstream untemplated guanosine (uuG). The vertical line separates putative noncapped features (low-uuG, orange) from putative capped features (high-uuG, blue). (B) Volcano plot of the change in read abundance for putative capped features after digestion with Xrn1 exonuclease. Barplots depict the distribution of all capped features by fold change versus control. Dotted lines delimit a two-fold change in feature abundance. $\log_2$ fold change and Benjamini-Hochberg adjusted p-values (BH) were calculated by DEseq2. Horizontal line demarcates an adjusted p-value of 0.05. (C) Volcano plot as in (B) for putative noncapped features. (D) Capped and noncapped features overlapping TAIR10 genes classified by gene type. Lighter bars include features up to 500 nucleotides upstream of the annotation. (E) Positional distribution of capped (top) and noncapped (bottom) features that overlap protein-coding genes.

It was hypothesized that this bimodal distribution indicated two populations of RNA 5' ends: high-uuG "capped" features that contain an m7G cap, and low-uuG "noncapped" features that contain alternative 5'-end structures, predominantly monophosphates. The yeast Xrn1 exoribonuclease specifically degrades 5'-monophosphate RNA in the 5'-to-3' direction, leaving capped RNA intact (Nagarajan et al. 2013). nanoPARE was then performed on the same total RNA samples after subjecting them to exonucleolytic digestion by Xrn1 and examined the change in abundance of the putative capped and noncapped features using DEseq2 (Love et al. 2014) (FIG. 2B, C). As expected, nearly all capped features showed no significant change in abundance after Xrn1 digestion. Capped features globally increased in relative abundance by a mean of 8.1%, a small proportion significantly increased (237; 1.1%) and only a small minority of capped features (13; 0.06%) were significantly reduced after digestion (FIG. 2B). In contrast, a global decrease was observed in the abundance of putative noncapped features after Xrn1 digestion, with a mean reduction of 19.5%, and a statistically significant reduction in 314 of 2,173 noncapped features (14.5%; FIG. 2C).

Capped and noncapped features have distinct distributions in the genome. Capped features have an even distribution across the non-centromeric region of the nuclear genome, whereas noncapped features are highly concentrated on the mitochondrial and chloroplast genomes and more sparsely dispersed in the nuclear genome. The 5' ends of chloroplast and mitochondrial RNA do not possess m7G caps (Monde et al. 2000; Grohmann et al. 1978; Legen et al. 2002). Accordingly, the 5' features mapping to chloroplasts and mitochondria were classified as 94% and 95% noncapped, respectively. Moreover, capped and noncapped features localized to different gene types (FIG. 2D). Consistent with caps being associated only with RNA polymerase II (polII) transcripts, nanoPARE identified predominantly capped features for mRNA, long noncoding RNA, and primary microRNA. Surprisingly, several noncapped features mapping to pre-tRNA and rRNA loci, which are not transcribed by polII, could be identified. While these products normally do not possess a poly(A) tail, a subset will be transiently polyadenylated by the TRAMP complex prior to their degradation (Hopper et al. 2010), and nanoPARE may be detecting this subset. Even within a class of RNA, the behavior of capped and noncapped features is quite distinct. For example, a majority of snoRNAs in *Arabidopsis* are transcribed in tandem arrays of two or more species from a single polII precursor (Dieci et al. 2009). EndGraph identified both a noncapped feature at the mature 5' terminus and a capped feature upstream of many annotated snoRNAs (FIG. 2D). Several primary snoRNAs contain additional noncapped features not predicted by TAIR10 annotations, and these species were validated by a large-scale identification of *Arabidopsis* noncoding RNA (Wang et al. 2014).

Protein-coding mRNA also displays a distinct distribution of capped and noncapped 5' end features. Among capped features contained in nuclear protein-coding genes, 95% mapped to the annotated 5' UTR (FIG. 2E). Noncapped features showed an opposite trend, accumulating closer to the 3' terminus of protein-coding genes, particularly just upstream of the stop codon. This pattern closely resembles the reported pattern of co-translational decay detected in degradome data, which is mediated by the major cytoplasmic exonuclease EXORIBONUCLEASE4 (XRN4) (Yu et al. 2016; Hou et al. 2016). To test whether the steady state by-products of XRN4 digestion are detected with nanoPARE, nanoPARE and Smart-seq2 libraries were generated for floral buds of xrn4-5 mutants and performed de novo 5' feature identification. All features identified in wild-type floral buds (with or without Xrn1 digestion) and/or xrn4-5 floral buds were combined to produce a unified set of 5' end features. Because XRN4 is restricted to the cytoplasm (Kastenmayer and Green 2000), 5'-monophosphate ends of nuclear-localized noncoding RNA primary transcripts, including pre-miRNAs and pri-snoRNAs, should be unaffected in the xrn4-5 loss-of-function mutant. The 5' features identified by EndGraph were manually curated to identify all features associated with mature or primary noncoding RNAs. While the 3' cleavage products of pri-snoRNA, pre-miRNA, and mitochondrial and chloroplast pri-tRNA were all reduced by Xrn1 digestion in vitro, the abundance of these features remained stable between wild-type and xrn4-5 floral buds, which is consistent with the cytoplasmic localization of XRN4.

Consistent with wild-type XRN4 digesting full-length decapped mRNA, noncapped features upstream and adjacent to stop codons were globally decreased in relative abundance in xrn4-5 mutants, concomitant with a relative increase in reads contained by capped features. Together, these trends predict an increase in full-length transcripts that contain 5'-monophosphates in xrn4 mutants. Indeed, the accumulation of full-length decapped mRNA has been reported in xrn4 mutants (Gregory et al. 2008), and reanalysis of public PARE data from wild-type and xrn4-5 inflorescences (German et al. 2008) reveals a global average increase by more than three-fold in the proportion 5' monophosphate RNA ends mapping to capped features defined by nanoPARE. Overall, the capped and noncapped 5' features identified by EndGraph support the existing model of XRN4 as a general RNA decay factor that acts downstream of decapping.

TSS Characterization

To test the reproducibility of nanoPARE to detect 5' end features from low-input RNA, nanoPARE libraries were generated from a dilution series of the original floral bud total RNA in triplicate: 1 ng, 100 pg, and 10 pg of total RNA input, which is typically less than or equal to the amount of total RNA found in a single cell (Brennecke et al. 2013; Ramsköld et al. 2012). De novo feature identification was performed using the Smart-seq2 libraries from 5 ng of RNA as a background model. To assess the sensitivity of the method at recovering genuine capped transcription start sites, the capped features of the dilution series were compared to a set of 9,326 transcription start sites identified by a cap-specific 5' sequencing protocol (Paired-End Analysis of Transcription Start Sites; PEAT) applied to whole *Arabidopsis* roots (Morton et al. 2014). As a baseline, it was tested whether the *Arabidopsis* reference annotations, TAIR10 and Araport11, contained a transcript model with a 5' end within 50 bp of a given PEAT peak. TAIR10 detected 75% of PEAT peaks under this definition (FIG. 3A). Surprisingly, the more recent Araport11 annotations performed much worse at accurately detecting transcription start sites. Only 2,239 (24%) PEAT peaks fell within 50 bp of any transcript 5' ends defined in Araport11, which is likely due to the systematic overextension of transcript UTRs during transcript assembly. Despite the different tissue type and preparation method, nanoPARE outperformed both reference annotations at detecting experimentally validated transcription start sites, down to 1 ng of total RNA (FIG. 3A). Furthermore, when comparing the precision of peaks, all nanoPARE dilutions, including those generated from 10 pg of total RNA, had a higher likelihood of agreeing with the PEAT data on the exact nucleotide position of the transcription start site peak (FIG. 3A, B). Finally, the sensitivity of the method was examined by comparing identified capped features with the transcript abundance as measured by Smart-seq2 (FIG. 3C). Remarkably, nanoPARE reproducibly identified at least one capped feature overlapping 76.6% of all protein-coding transcripts detected at or above 0.1 transcripts per million (TPM) when libraries were generated from 5 ng of total RNA (18,295/23,900 genes). This value increased to 91.9% for transcripts detected at a threshold of 1 TPM (18,111/19,706 genes), and 99.0% for transcripts of at least 10 TPM (11,165/11,294 genes).

FIG. 3 shows the sensitive low-input transcription start site detection with nanoPARE. (A) Recall of capped peaks identified with PEAT (Morton et al. 2014) in two *Arabidopsis* reference annotations (TAIR10 and Araport11) and in nanoPARE features detected from a dilution series of total RNA input. Numbers indicate how many PEAT peaks have a 5' end feature within 50 bp in the test dataset. (B) Cumulative frequency distribution of positional error for all 5' features within 200 nt of a PEAT peak. (C) Sensitivity of nanoPARE in detecting capped 5' features for nuclear protein-coding genes as a function of their abundance measured by Smart-seq2. Points indicate the percent of transcripts above the given threshold abundance (in transcripts per million, TPM) that contain a capped feature identified in at least 2 of 3 biological replicates. (D) Integrated Genomics Viewer (IGV) browser image of nanoPARE reads from the dilution series mapping to two transcription start sites of the PSY locus. Y-axis shows mean reads per million (RPM) across three biological replicates for each dilution. Solid bars mark capped features identified by EndGraph in each dilution.

In contrast, only 0.4% of transcripts not detected with Smart-seq2 (0 TPM, 20/5,419 genes) were assigned a capped feature. Overall, the 5 ng, 1 ng, and 100 pg samples performed similarly well, especially for robustly detected transcripts. Sensitivity reduced substantially between 100 pg and 10 pg of total RNA without affecting the precision of the capped features identified (FIG. 3A, B). Multiple distinct TSS could even be identified at all dilutions for certain highly expressed genes (FIG. 3D). Therefore, nanoPARE capped features represent genuine transcription start sites, and can be used for transcription start site analysis with as little as 10 pg of input RNA.

Detecting sRNA-Mediated Cleavage Sites

In plants, Argonaute-bound small RNAs (sRNAs) recognize highly complementary 20-22 nt target sites and mediate target RNA cleavage precisely between the $10^{th}$ and $11^{th}$ nucleotides of the sRNA:target duplex (Jones-Rhoades and Bartel 2004; Llave et al. 2002; Kasschau et al. 2003). Because nanoPARE reads map to the 5' ends of noncapped transcripts (FIG. 2), it was reasoned that the first position of nanoPARE reads should also be precisely enriched at sRNA target cleavage sites and thus allow their identification from low-input RNA samples. To test whether nanoPARE reads from libraries generated with low-input RNA samples are enriched at sRNA target cleavage sites, predicted cleavage sites were examined for either miRNAs or trans-acting siRNAs (tasiRNAs) in libraries prepared from 5 ng of total RNA isolated from flowers. The 5' ends of nanoPARE reads were enriched at cleavage sites pairing to highly complementary miRNAs including those from previously characterized miRNA cleavage sites in wild-type (Col-0) flowers. As expected for sRNA-directed cleavage products that are 5' monophosphorylated, the number of nanoPARE reads at cleavage sites were reduced when RNA was incubated with the Xrn1 exoribonuclease prior to library generation. Conversely, nanoPARE read enrichment at cleavage sites were increased in xrn4-5 exoribonuclease mutants which stabilize sRNA cleavage products (German et al. 2008; Souret et al. 2004).

In addition to biological variation between tissues or genotypes, variability between nanoPARE/PARE libraries can also be largely due to technical differences in RNA quality and quantity, as well as library complexity and sequencing depth. Therefore, software called EndCut was developed that employs empirically determined null models to compute the likelihood that nanoPARE read 5' ends are enriched at predicted target sites greater than expected by chance in each library. EndCut uses two metrics to calculate this likelihood: the level of sRNA:target complementarity and the local enrichment of nanoPARE read 5' ends at predicted cleavage sites relative to surrounding transcribed regions. The levels of complementarity between annotated sRNAs and transcripts were quantified using previously developed criteria based on the frequency and position of miRNA:target duplex mismatches (Allen et al. 2005). The local enrichments of nanoPARE reads at cleavage sites were determined by calculating the ratio of nanoPARE reads observed at the predicted cleavage sites compared to the maximum number of reads detected within surrounding 20 or 50 nt transcript regions. It is referred to these two metrics as Allen scores and fold-changes, respectively. To generate sRNA-specific null models of the Allen scores and fold-changes expected by chance for individual nanoPARE datasets, 1,000 randomized versions of each sRNA were generated, each of their targets in the *Arabidopsis* transcriptome were predicted, the frequencies of Allen scores and fold-changes observed were quantified, and the corresponding empirical cumulative distribution functions were computed. The null models were then used to determine whether predicted sites with nanoPARE reads occurred lesser (Allen scores) or greater (fold-changes) than expected by chance, and then were combined to generate P-values for each predicted cleavage site with at least one nanoPARE read detected in that sample.

To assess the validity of EndCut, the proportions of nanoPARE read 5' ends within and adjacent to miRNA cleavage sites were examined and determined to be significant in at least one of the nanoPARE libraries prepared from Col-0 flower RNA without Xrn1 treatment (Col-0 (−Xrn1)). As expected for miRNA cleavage sites, the number of nanoPARE reads at these sites were significantly decreased 9.7-fold upon Xrn1 treatment (Col-0 (+Xrn1)) or significantly increased 1.8-fold in xrn4-5 mutants (P-values=$1.08 \times 10^{-26}$ and 0.037, respectively; one-tailed K-S tests). Moreover, the number of significant cleavage sites identified by EndCut in Col-0 flowers either treated or not treated with Xrn1 prior to library construction was compared, as well as from xrn4-5 and tasiRNA-deficient dcl234 mutant flowers (Gasciolli et al. 2005; Henderson et al. 2006; Howell et al. 2007; Yoshikawa et al. 2005). 58 total miRNA target sites in Col-0 flowers with a mean of 32.7 miRNA target sites among three biological replicates were identified. The mean number of miRNA target sites identified upon Xrn1 treatment was significantly reduced 7-fold and significantly increased 1.6-fold in xrn4-5 flowers (P-values=$1.52 \times 10^{-3}$ and 0.041, respectively; one-tailed t-tests). 26 significant miRNA:target cleavage sites in at least two biological replicates of Col-0 flowers were also identified and these high-confidence sites had decreased and increased numbers of nanoPARE read 5' ends in libraries from Xrn1-treated RNA and xrn4-5 mutant flowers, respectively.

In addition to miRNAs, four significant tasiRNA target sites in Col-0 (−Xrn1) samples were also detected, including two of which were detected in at least two biological replicates. Similar to what was observed for miRNA cleavage sites, significantly detected tasiRNA cleavage sites in Col-0 (−Xrn1) samples had reduced numbers of both significant target sites and reads mapping to cleavage sites upon Xrn1 treatment. Both the number of significantly detected tasiRNA target sites and reads mapping to cleavage sites were increased in xrn4-5 mutants. Importantly, whereas miRNA target sites significantly detected in Col-0 (−Xrn1) samples were generally unaffected in tasiRNA-deficient dcl234 mutants, none of the corresponding tasiRNA target sites were significantly detected in dcl234 mutants and zero reads corresponding to these target sites were observed. Out of the 58 high-confidence miRNA and tasiRNA target sites detected in either Col-0, xrn4-5 or dcl234 flowers, 48 (82.8%) had been previously validated by a modified 5' RACE technique, while 5 of the remaining 10 have genetic or expression data indicating that they are sRNA targets (Wu et al. 2006; Nodine and Bartel 2010; Wu et al. 2009; Wang et al. 2009). Based on the above biochemical and genetic tests, EndCut enables the accurate identification of sRNA-mediated cleavage events from nanoPARE data generated with as low as 5 ng of total RNA.

PARE methods capture sRNA cleavage products through a series of adapter/RNA ligations, Type IIS restriction enzyme digestions and PCR amplifications (Addo-Quaye et al. 2008; German et al. 2008; Gregory et al. 2008). Because EndCut utilizes empirically determined null models based on randomized sRNAs, it can also be used to mitigate the effects of technical biases in conventional PARE datasets and help identify high-confidence target sites. As a proof-of-principle, EndCut was applied to 15 publicly available degradome/PARE datasets generated from at least 10 μg of total RNA from wild-type (Col-0) or xrn4-5 mutant flowers. The number of significant cleavage sites detected with EndCut varied between publicly available datasets, and included 263 miRNA target sites and 22 tasiRNA target sites in total. Together with the nanoPARE libraries reported here, the total number of significantly detected miRNA and tasiRNA target sites in Col-0 or xrn4-5 flowers is 296 and 29, respectively. Therefore, EndCut can also be applied to datasets generated with the standard PARE methods to determine the likelihood that reads are enriched at predicted target sites greater than expected by chance.

DISCUSSION

It was surprisingly shown that nanoPARE is able to accurately identify capped and noncapped RNA 5'-end features from as little as 10 pg of total RNA. This allows for mapping TSS at single-nucleotide resolution and detection of small-RNA mediated cleavage events from low-input RNA samples. Therefore, nanoPARE's integrative approach of combining RNA 5'-end enrichment and full-length Smart-seq2 datasets from the same sample can be used for the genome-wide characterization of biological RNA 5' end diversity in rare tissue and individual cell types.

RNA 5' end profiling studies have traditionally been performed on biochemically enriched capped or noncapped RNA species (CAGE, PARE) which require relatively large amounts of RNA input (Willmann et al. 2014; Zhai et al. 2014). Recently, RNA 5' end sequencing technologies have been developed for low-input amounts such as single-cells and rare tissue types, mainly with the purpose of TSS mapping (Salimullah et al. 2011), digital quantification (Islam et al. 2013) and cost-reduction (Cole et al. 2018). Because there is no enrichment for capped or noncapped 5' ends in such strategies, inferring biological relevant RNA 5' ends can be challenging due to technical artifacts arising during library preparation (Cumbie et al. 2015). As a result, noncapped RNA features mapping to the gene-body have received little attention in low-input RNA 5' end profiling methods (Karlsson et al. 2017).

NanoPARE enriches for RNA 5' ends and EndGraph integrates such information with gene body Smart-seq2 data from the same sample to confidently identify RNA 5' ends. Transcript ends are further classified as capped and noncapped species based on the existence of additional untemplated guanosines at the 5' end of $m^7G$-capped RNAs. Based on both experimental validation and comparisons with available datasets, NanoPARE accurately identifies a broad spectrum of RNA 5' ends including capped TSS and noncapped processed RNA intermediates such as snoRNAs, snRNAs, rRNAs and pre-microRNAs.

Because TSS partition the genome into transcribed and cis-regulatory regions, their accurate identification is critical for transcriptome assembly and prediction of regulatory binding sites. Moreover, TSS can vary among cell types and thus their identification from low-input RNA samples can increase our understanding of diverse RNA processing events and corresponding functions. NanoPARE can precisely identify TSS from as little as 10 µg of total RNA, which is typically less than the amount of total RNA found in a single-cell (Ramsköld et al. 2012; Brennecke et al. 2013) (FIGS. 3A, B). By integrating RNA 5' end and gene body information, nanoPARE can therefore be used for TSS mapping at single-nucleotide resolution and thus give insights into transcript architecture and regulation from whole tissues, specific cell types or single cells.

Small RNA-directed cleavage of RNA targets is an important regulator of cellular differentiation and physiology, as well as silencing of transposons and viruses (Bartel 2004; Borges and Martienssen 2015). The identification of sRNA targets is therefore essential for understanding the molecular basis of sRNA functions. PARE methods profile sRNA-mediated targeting events genome-wide and have been key technologies for characterizing the mechanistic basis of small RNA-mediated post-transcriptional regulation (Addo-Quaye et al. 2008; German et al. 2008; Gregory et al. 2008). However, conventional PARE methods biochemically enrich for 5' monophosphate-containing RNA, and therefore require relatively large amounts of input RNA. Because this limits sRNA target profiling to whole organisms or tissues composed of multiple cell types, sRNA/target interactions that occur in specific cell types or developmental stages may not be detected by such current methods. Strikingly, it was found that nanoPARE captures sRNA-mediated cleavage products from at least 10,000-fold less input RNA compared to conventional methods. Most of these targets had been identified by 5' RACE, and as expected for sRNA-mediated cleavage products, reads corresponding to the cleavage sites were decreased upon Xrn1 treatment and increased in mutants of the *Arabidopsis* XRN1 ortholog, XRN4, relative to wild-type. Therefore, nanoPARE can be used to accurately profile sRNA-mediated cleavage events from low-input RNA and thus can be applied to specific cell types.

NanoPARE addresses current limitations of RNA 5' end sequencing methods by utilizing a modified Smart-seq2 library preparation method combined with computational pipelines for the parallel identification of capped and noncapped RNA 5' ends, including sRNA-mediated cleavage products, from the same low-input sample. NanoPARE further enables 5'-end RNA profiling from existing full-length Smart-seq2 libraries, which has become a commonly used single-cell sequencing method (Ziegenhain et al. 2017). Such re-sampling at the level of cDNA rather than tissue is unique and not possible with technologies such as CAGE, STRT-Seq, Tn5-Prime and PARE. Therefore, further applications of nanoPARE on both existing and new datasets for dissecting cell type specific transcriptional and post-transcriptional RNA regulatory mechanisms are possible.

Methods

Plant Material and Growth.

Wild type and mutant (xrn4-5, dcl234) seeds were in Col-0 accession backgrounds and were grown in climate controlled growth champers with 20-22° C. temperature and 16 h light/8 h dark cycle. The dcl234 mutants were composed of dcl2-1, dcl3-1 and dcl4-2 alleles as previously described (Henderson et al. 2006). Seeds for xrn4-5 mutants were obtained from the ABRC stock center and genotyped as previously described (Souret et al. 2004). All primer sequences are listed in Table 1.

RNA Extraction

Total RNA was extracted from 28-day old stage 12 floral buds using Trizol (Life Tech). RNA integrity was assessed by a Fragment Analyzer (AATI) using the standard RNA sensitivity kit (DNF-471). Samples with RNA integrity values >7 were quantified with a Nanodrop (ThermoFisher) and diluted to 5 nanogram total RNA unless otherwise indicated and stored upon use at −80° C.

Library Preparation Protocol

The detailed protocol is as follows:

NanoPARE Protocol

Materials

Oligonucleotides see Table 1

Reverse Transcription dNTP mix (10 mM; ThermoFisher)

Superscript II reverse transcriptase (200 U/µL; Invitrogen/Life Tech)

Superscript II First-Strand Buffer (5×; Invitrogen/Life Tech)

DTT (100 mM; Invitrogen/Life Tech)

Murine RNAse inhibitor (40 U/pL; NEB)

Betaine (5 M; Sigma)

MgCl2 (100 mM; Sigma)

PCR Preamplification

KAPA HiFi HotStart ReadyMix (2×; KAPPA Biosystems)

EB solution (Qiagen) or Nuclease free water

High-sensitivity DNA chip (Agilent Bioanalyzer)

Tagmentation Reaction and Final PCR

Nextera DNA Sample Preparation kit (Illumina)

Procedure

Reverse Transcription

1. Prepare first-strand reaction mix as follows (7 μL per reaction):
0.5 μL Superscript II RT
0.25 μL Murine RNase Inhibitor
2 μL Superscript II first-strand buffer (5×)
0.25 μL DTT (0.1 M)
2 μL Betaine (5 M)
0.9 μL MgCl2 (100 mM)
1 μL TSO oligo (10 μM)
0.1 μL Nuclease free water
7 μL total
2. Mix 1 μL of total RNA with 1 μL of anchored oligo-dT primer (10 μM) and 1 μL of dNTP mix.
3. Denature at 72° C. for 3 minutes and place immediately on ice.
4. Add 7 μL of first-strand reaction mix to above RNA/oligo-dT/dNTP mix, and mix by pipetting up and down 10 times.
5. In thermal cycler incubate at 42° C. for 90 minutes, then 10 cycles of (50° C. for 2 minutes, 42° C. for 2 minutes) and finally inactivate by incubating at 70° C. for 15 minutes.

PCR Preamplification

1. Make PCR mastermix, add directly to inactivated RT reaction above, and mix by pipetting up and down 10 times.
14 μL Nuclease-free water
25 μL 2× KAPA HiFi HotStart ReadyMix
1 μL 10 μM ISPCR Primer (1 uM final)
10 μL RT reaction from above
50 μL total
2. In thermal cycler incubate at 98° C. for 3 minutes, 11-20 cycles of (98° C. for 15 seconds, 67° C. for 20 seconds, 72° C. for 6 minutes) and final extension at 72° C. for 5 minutes.
Note: Adjust PCR preamplification cycle count for RNA input. Here are some guidelines for total RNA: 11 cycles for 5 ng, 13 cycles for 1 ng, 15-16 cycles for 100 pg and 16-18 cycles for 10 pg. It is recommended to perform negative controls by replacing the RT reaction products with water and using the maximum number of PCR cycles used for samples.
3. Purify PCR product using a 1:1 ratio of AMPure XP beads a. Let beads come to room temperature for 30 minutes.
b. Vortex two times for 2 seconds each and add 50 μL of beads to each sample.
c. Pipette up and down 10 times and incubate at room temperature for 8 minutes.
d. Place on magnetic stand for five minutes.
e. Pipette off supernatant and try not to disturb the beads.
f. Keep on magnetic stand and add 200 μL of fresh 80% ethanol, wait 30 seconds and remove supernatant.
g. Repeat washing step and remove supernatant completely. Note: Tn5 is sensitive to ethanol.
h. Incubate at room temperature for five minutes, and remove from magnetic stand.
i. Add 16 μL of elution buffer (EB solution from Qiagen), pipette up and down 10 times, put on magnetic stand for 2 minutes and collect 15 μL in new Eppendorf tube (1 μL is left to avoid taking up beads).
4. Run 1 μL on High-sensitivity Bioanalyzer DNA chip (Agilent) or Fragment Analyzer (Advanced Analytical) to determine median size and range. Note: expected sizes vary by organism, but fragments <300 bp should be negligible. Measure concentration between 300 and 9000 bp.
Use 5 ng of cDNA for tagmentation
x μL cDNA (Final 5 ng)
2.5 μL Tn5 Tagmentation enzyme
12.5 μL Tagmentation Buffer
x μL Nuclease free water to 25 μL
25 μL Total
Incubate for 5 min at 55° C. and cool to 4° C. or place on ice (Tn5 is active at room temperature and overtagmentation can occur)
Clean up with DNA Clean & Concentrator-5 kit (Zymo Research)
Add 125 μL binding solution to 25 μL tagmentation reaction
Apply to column and spin for 30 seconds at >12000×g
Wash 2× with 200 μL washing buffer
Elute in 21 μL of resuspension buffer 5'-End Enrichment PCR (NanoPARE)

At this point, transcript body regions can be enriched from the above PCR amplification products using standard Nextera primers according to Picelli et al. (i.e. Smart-seq2; Picelli et al. 2013) or RNA 5' ends can be enriched as described below.
Split tagmentation reaction in two 10 μL aliquots and perform enrichment PCR with either Tn5.1 or Tn5.2 as the reverse primer and P5 N5xx TSO enrichment primer as the forward primer
7.5 μL Nextera PCR Mastermix
2.5 μL 10 μM P5 N5xx TSO enrichment Primer (1 μM final)
2.5 μL 10 μM P7 Tn5.1/Tn5.2 enrichment Primer (1 μM final)
10 μL Tagmentation reaction
2.5 μL Nuclease free water
25 μL total
In thermal cycler perform enrichment PCR by incubating at 72° C. for 3 minutes to allow extension of single-stranded DNA adapters to form double-stranded DNA), 98° C. for initial denature, then 10 cycles of (98° C. for 10 seconds, 63° C. for 30 seconds, 72° C. for 3 minutes), inactivate by incubating at 72° C. for 1 minute and hold at 12° C.
Pool both 25 μL reactions and clean up using AMPure XP beads in 1:1 ratio as described above (50 μL beads)

Quality Control

Run High-sensitivity Bioanalyzer DNA chip (Agilent) or Fragment Analyzer (Advanced Analytical) to check for mean fragment length. Informative fragments should have a length of 150-800 bp. Overtagmentation results in short fragments of about 135 bp long and which will have low mappability. In such cases, check cDNA input and make sure that it does not exceed 5 ng for 2.5 μL Tn5 Enzyme mix. Also avoid keeping tagmentation reaction for too long on thermoblock.

Next-Generation Sequencing

Quantify library and pool in equimolar ratio (about 4 nM each).
For Illumina HiSeq2500 machines: Sequence with custom sequencing primer listed in Table 1 (TSO_seq_read1). Typically Single Read 50 base mode at a sequencing depth >10-15 million reads is sufficient. If possible, replace Index 1 (i7) Read primer with an equimolar mix of primers P7_Tn5.1_N701 and P7_Tn5.1_N701 to allow for dual indexing. Alternatively, run dual indexing with chemistry-only cycles for Read 1 (i7) and use i5 sequences only for indexing.
For Illumina NextSeq machines: Replace Index 2 (i5) Read primer with a custom primer (SEQ ID NO: 17: CCCGTACTCTGCGTTGATACCACTGCTTGCTAG, which is the reverse complement of custom sequencing primer listed in Table 1 (TSO_seq_read 1).

In brief, cDNA library preparation from 5 ng or less total RNA was carried out according to the original Smart-seq2 method (Picelli et al. 2013). The resulting cDNA was either processed to obtain final mRNA-Seq libraries or 5' end enriched fragments (NanoPARE). For NanoPARE libraries, 5 ng of cDNA was tagmented using the Illumina Nextera DNA library preparation kit (12.5 µL of Tagmentation buffer, 2.5 µL of Tn5 Transposase in a final volume of 25 µL) for 5 minutes, purified using the Zymo 5× DNA Clean and Concentrator kit (ZymoResearch) and eluted with 20 µL nuclease-free water. For final enrichment PCR, the purified reaction was split and amplified either with Tn5.1/TSO enrichment oligonucleotide or Tn5.2/TSO enrichment oligonucleotide primer sets in a 25 µL PCR reaction (7.5 µL Nextera PCR Master mix, 2.5 µL of Tn5.1/Tn5.2, 2.5 µL TSO enrichment primer, 10 µL purified tagmentation reaction, 2.5 µL Ultragrade water) (Table 1). PCR conditions were 72° C. for 3 minutes, 98° C. for 30 seconds, 10 cycles of (98° C. [30 seconds], 63° C. [30 seconds], 72° C. [3 minutes]) followed by a final extension of 1 minute at 72° C. PCR reactions with Tn5.1/TSO enrichment oligonucleotide and Tn5.2/TSO enrichment oligonucleotide primer sets were pooled and purified using AMPureXP DNA beads in 1:1 sample to bead ratio.

To control for library quality, final nanoPARE libraries were diluted 1:10 in nuclease-free water, and 1 µl of diluted library DNA was checked on an Agilent DNA HS Bionalyzer Chip. Informative fragments should have a length of 150-800 bp, and libraries with these size ranges were diluted to 4 nM and sequenced to 10-15 million single-end 50 bp reads per sample using a custom sequencing primer (TSO_Seq) and a custom P5/P7 index primer mix on an Illumina HiSeq 2500 llumina instrument). NanoPARE and full-length Smart-seq2 libraries were sequenced to 10-15 million single-end 50 bp or paired-end 50 bp reads per sample.

For in vitro biochemical degradation of 5' monophosphate-containing RNA, 100 ng of total RNA was treated with XRN1 exoribonuclease (NEB) for 60 minutes at 37° C. in a 20 µL reaction volume containing 1× NEB Buffer 3 and 1U of XRN1. The equivalent of 5 ng total RNA (1 µL of XRN1-treated reaction) was used for Smart-seq2 cDNA synthesis without additional purification.

Classification of RNA 5' Ends with EndGraph

The EndGraph pipeline was written for the paired analysis of 5' end RNA-seq experiments, such as nanoPARE (referred to hereafter as 5P experiments), and gene body reads from RNA-seq experiments such as Smart-seq2 (Picelli et al. 2013) (referred to hereafter as BODY experiments), in order to identify significant 5P features against the background of BODY reads. The analysis was divided into four major steps:

(1) Mapping of 5P and BODY reads to the genome (EndMap)
(2) 5P end feature identification (EndGraph)
(3) Classification of capped and noncapped 5P features (EndClass)
(4) Transcript-level output of read noncapped reads (EndMask)

EndMap

FASTQ files were mapped to the *Arabidopsis thaliana* TAIR10 genome (Lamesch et al. 2012) using EndMap. EndMap first trims the appropriate adapter sequences using cutadapt (Marcel 2011). To prevent reads with low sequence complexity from mapping to the genome, the I-complexity (Becher and Heiber 2012) of each FASTQ read was calculated by the Python script fastq_complexity_filter, and reads with a per-nucleotide I-complexity <0.15 were removed. The remaining reads were then aligned to the genome with STAR (Dobin et al. 2012). Mapping behavior differs slightly when BODY and 5P libraries. All reads were mapped using the STAR settings:

--runMode alignReads; --alignIntronMax 10000; --alignMatesGapMax 11000; --alignSJDBoverhangMin 1; --alignSJoverhangMin 10; --outSJfilterOverhangMin -1 15 15 15; --outSJfilterCountTotalMi -1 2 2 2; --outSJfilterCountUniqueMin-1 2 2 2; --outFilterType BySJout; --outFilterMismatchNmax 2; --outFilterMismatchNoverLmax 0.05; --twopassMode Basic; --outFilterIntronMotifs RemoveNoncanonicalUnannotated; --outFilterMultimapNmax 100; --outSAMmultNmax 100; --outSAMattributes NH HI AS nMNMMD jMjIXS; --outSAMprimaryFlagAllBestScore; --outSAMtype BAM Unsorted BODY reads were mapped with the additional settings:
-alignEndsType EndToEnd
5P reads were mapped with the additional settings:
-alignEndsType Local; --outFilterMatchNminOverLread 0.9

After alignment to the genome, a bias correction algorithm was applied to the aligned BAM file to adjust for sequence-specific biases in the BODY and 5P libraries. The bias correction method defined by Wang et al. (Wang et al. 2017) was used, with two modifications to make it suitable for RNA rather than DNA data: (1) only reads within exons of annotated genes were used to calculate the k-mer frequency matrix, and (2) the read depth for all positions with >1 read was set to 1, because RNA seq reads are not expected to have even coverage at all genomic locations. After bias correction, 5' end read depth for each position in the genome was calculated from the BAM file using the Python script readmapIO. The BAM file contains reads that mapped from 1-100 times to the reference genome. For reads that mapped to more than one location, the most likely locus of origin was inferred via a "rich-get-richer" algorithm similar to that employed by the software MuMRescue and MuMRescueLite (Faulkner et al. 2008; Hashimoto et al. 2009). ReadmapIO begins by calculating the coverage depth of each position in the genome that is covered by uniquely mapping reads. Multimappers are then binned by their mapping multiplicity (i.e. a read that maps to 10 locations in the genome has a multiplicity of 10). Beginning with a multiplicity of 2, all reads in that bin are sorted from lowest possible genomic position to highest, and each read is assigned in a multistep process: if≥1 mapping position contains ≥1 existing read, the read is considered "unambiguous", and is assigned proportionally to its mapping locations using the formula $$P_i = \frac{C_i}{\sum_{j=1}^{n} C_j},$$

where $P_i$ is the proportion of reads assigned to mapping location i, $C_i$ is the total existing read coverage assigned to the genomic positions that comprise location i, and n is the number of mapping locations for the read. If the existing read coverage at all locations is 0, that read is not yet assigned. After examining all reads in the bin, the bin is sorted from highest genomic position to lowest and the process is repeated, until no more unambiguous reads can be identified. At this point, all remaining reads in the bin are assigned with equal weighting, or $$P_i = \frac{1}{n}.$$

Bins are assigned this way in order from a multiplicity of 2 to 100. After all reads are assigned, readmapiO outputs a bedgraph file of assigned read 5' end counts for the plus and minus strand of the genome. If the library type is 5P, readmapIO also outputs bedgraph files of all nucleotides softclipped from the 5' end of reads. These will be referred to hereafter as upstream untemplated nucleotides (uuNs).

EndGraph

Discrete 5P features were identified genome-wide via subtractive kernel density estimations. Bedgraph files output from EndMap and corresponding to a sample's 5P and BODY libraries were evaluated together. First, strand invasion artifacts (Tang 2012 Nucleic Acids Research) were masked based on complementarity to the last 4 bases of the template switching oligo. Then, a scaling factor (S) was estimated to normalize the read depth of the 5P library against the BODY library using the formula:

$$S = \frac{\sum_{i=1}^{n}(TPM_i * L_i)}{F * 10^6} * \frac{R_B}{R_E},$$

where n is the total number of transcripts, $TPM_i$ is the abundance of a transcript in transcripts per million, $L_i$ is the length of a transcript in nucleotides, F is the mean fragment length of the BODY library, $R_B$ is the total number of mapped BODY reads, and $R_E$ is the total number of mapped 5P reads. Then, a Laplace kernel with a bandwidth of 15 nucleotides was fit over the set of values (PR*S)−NR with the Python script bedgraph_kernel_density. Regions of continuous positive density were extracted with the Python script bedgraph_thresh_to_bed and written as discrete features to a bed file.

EndClass

If a 5P experiment was designed with multiple replicates, EndClass merged all 5P features that could be reproducibly identified in ≥2 replicates. Then, the presence of a m7G cap was predicted for each replicable feature. Reverse transcriptase can use m7G cap structures as a template, producing an upstream untemplated guanosine (uuG) at the 5' end of 5P sequencing libraries such as nanoCAGE (Cumbie et al. 2015). The proportion of reads containing uuG were calculated for all 5P features. A feature was considered capped if≥10% of all reads from a sample type that map within the feature contained uuG, otherwise the feature was considered noncapped.

EndMask

EndMask prepared a bedgraph file of 5P read positions relative to the start site of the dominant isoform of each gene in the reference annotation. Dominant isoforms were defined as the transcript isoform containing the most mapped reads. For nanoPARE libraries, this transcript-level bedgraph was generated with a cap-masked input in which 5P reads contained within replicable capped 5P features were discarded.

Detection of sRNA-Mediated Cleavage Sites with EndCut

Sequences from miRNAs and tasiRNAs annotated in TAIR10 or miRBase21 (Lamesch et al. 2012; Kozomara and Griffiths-Jones 2013) were selected (i.e. anno.mir.tas.fa) and randomized one thousand times each by the python script sRNA_shuffler.py to produce anno.mir.tas.i.fa files; where i is an integer between 0 and 999). For annotated miRNAs, annotated tasiRNAs and the corresponding 1,000 randomized variants for each miRNA/tasiRNA, GSTAr.pl (https://github.com/MikeAxtell/GSTAr) was used to predict target sites in transcript models annotated as protein-coding genes, transposable element genes or other RNAs (i.e. TAIR10_pe_teg_other_transcripts.fasta). As described above, nanoPARE data was aligned and corrected for nucleotide biases followed by assignment to sense strands of annotated transcripts with EndMap. For nanoPARE data, capped regions of transcripts were determined by EndGraph and excluded from further analyses with EndMask. Publicly available PARE data was downloaded from the Sequence Read Archive (NCBI). Alignments and nucleotide bias corrections of publicly available data were performed as described above, but alignments overlapping capped features were not excluded from downstream analyses.

Predicted target sites and EndGraph output were then used by EndCut_step1.sh to quantify the number of reads at predicted target sites and in adjacent 20 nt or 50 nt regions on the sense strand of the same transcript. Adjacent sites within one nucleotide of predicted cleavage sites were not considered in order to not penalize sites for sRNA isoforms with slightly offset target recognition sites. Fold-changes were calculated by dividing the numbers of nanoPARE read 5' ends at predicted cleavage sites+1 by the maximum numbers of reads in adjacent transcript regions+1. Allen scores were also assigned to each predicted cleavage site detected. For each randomized sRNA control set, EndCut_step2.R computed empirical cumulative distribution functions of fold-changes ($ECDF_{FC}$) and Allen scores ($ECDF_{AS}$). These were then used as null models to test whether the observed cleavage site fold-changes were not equal to or lesser than $ECDF_{FC}$, as well as if the observed site Allen scores were not equal to or greater than $ECDF_{AS}$. Final P-values were computed for each site by combining these two P-values using Fisher's combined probability test, and then adjusted for multiple testing using the Benjamini and Hochberg method. For our analyses, we selected predicted cleavage sites with final adjusted P-values<0.05, fold-changes >1.0 and that were also represented by at least one read per ten million transcriptome-mapping reads.

TABLE 1

| | Oligos used herein | | |
|---|---|---|---|
| Name | Sequence | step used | additional information |
| Anchored oligo-dT rimer | SEQ ID NO: 1: AAGCAGTGGTATCAACGCAGAGTACT30 $N^1N^2$ | Reverse transcription | '$N^1$' is any base and '$N^2$' is either 'A', 'C' or 'G' |

TABLE 1-continued

Oligos used herein

| Name | Sequence | step used | additional information |
|---|---|---|---|
| TSO | SEQ ID NO: 2:<br>AAGCAGTGGTATCAACGCAGAGTAC<br>$N^1$ G$N^2$ G $N^3$ G | Reverse transcription | $N^3$ is LNA base, $N^1$, $N^2$ is ribonucleotide, HPLC purified |
| TSO 5' Biotin | SEQ ID NO: 3:<br>/5Biosg/AAGCAGTGGTATCAACGCAGAGT<br>AC $N^1$ G$N^2$ GG $N^3$ G | Reverse transcription | 5'-Biotinylated, $N^{3'}$ is LNA base, $N^1$, $N^2$ is ribonucleotide, HPLC purified, preferred to avoid concatemerization |
| ISPCR | SEQ ID NO: 4:<br>AAGCAGTGGTATCAACGCAGAGT | PCR-preamplification | |
| P5_TSO_N501 | SEQ ID NO: 5:<br>AATGATACGGCGACCACCGAGATCTACA<br>CTAGATCGCCTAGCAAGCAGTGGTATCA<br>ACGCAGAGTACGGG | NanoPARE 5'end enrichment | Illumina Nextera N501 index, PAGE purified |
| P5_TSO_N502 | SEQ ID NO: 6:<br>AATGATACGGCGACCACCGAGATCTACA<br>CCTCTCTATCTAGCAAGCAGTGGTATCAA<br>CGCAGAGTACGGG | NanoPARE 5'end enrichment | Illumina Nextera N502 index, PAGE purified |
| P5_TSO_N503 | SEQ ID NO: 7:<br>AATGATACGGCGACCACCGAGATCTACA<br>CTATCCTCTCTAGCAAGCAGTGGTATCAA<br>CGCAGAGTACGGG | NanoPARE 5'end enrichment | Illumina Nextera N503 index, PAGE purified |
| P5_TSO_N504 | SEQ ID NO: 8:<br>AATGATACGGCGACCACCGAGATCTACA<br>CAGAGTAGACTAGCAAGCAGTGGTATCA<br>ACGCAGAGTACGGG | NanoPARE 5'end enrichment | Illumina Nextera N504 index, PAGE purified |
| P5_TSO_N505 | SEQ ID NO: 9:<br>AATGATACGGCGACCACCGAGATCTACA<br>CGTAAGGAGCTAGCAAGCAGTGGTATCA<br>ACGCAGAGTACGGG | NanoPARE 5'end enrichment | Illumina Nextera N505 index, PAGE purified |
| P5_TSO_N506 | SEQ ID NO: 10:<br>AATGATACGGCGACCACCGAGATCTACA<br>CACTGCATACTAGCAAGCAGTGGTATCA<br>ACGCAGAGTACGGG | NanoPARE 5'end enrichment | Illumina Nextera N506 index, PAGE purified |
| P5_TSO_N507 | SEQ ID NO: 11:<br>AATGATACGGCGACCACCGAGATCTACA<br>CAAGGAGTACTAGCAAGCAGTGGTATCA<br>ACGCAGAGTACGGG | NanoPARE 5'end enrichment | Illumina Nextera N507 index, PAGE purified |
| P5_TSO_N508 | SEQ ID NO: 12:<br>AATGATACGGCGACCACCGAGATCTACA<br>CCTAAGCCTCTAGCAAGCAGTGGTATCA<br>ACGCAGAGTACGGG | NanoPARE 5'end enrichment | Illumina Nextera N508 index, PAGE purified |
| P5_TSO_S510 | SEQ ID NO: 13:<br>AATGATACGGCGACCACCGAGATCTACA<br>CCGTCTAATCTAGCAAGCAGTGGTATCAA<br>CGCAGAGTACGGG | NanoPARE 5'end enrichment | Illumina Nextera S510 index, PAGE purified |
| P7_Tn5.1_N701 | SEQ ID NO: 14:<br>CAAGCAGAAGACGGCATACGAGATTAA<br>GGCGATCGTCGGCAGCGTC | NanoPARE 5'end enrichment | Illumina Nextera N701 index, PAGE purified |
| P7_Tn5.2_N701 | SEQ ID NO: 15:<br>CAAGCAGAAGACGGCATACGAGATTAA<br>GGCGAGTCTCGTGGGCTCGG | NanoPARE 5'end enrichment | Illumina Nextera N701 index, PAGE purified |
| TSO_seq_read1 | SEQ ID NO: 16:<br>CTAGCAAGCAGTGGTATCAACGCAGAGT<br>ACGGG | Illumina custom sequencing primer for i5 index | Custom sequencing primer |

Example 2

Establishment of Low-Input Small RNA Sequencing Method

To systematically characterize the dynamics and functions of individual embryonic miRNAs in *Arabidopsis*, it was first necessary to determine the miRNAs present in developing embryos. Standard high-throughput sRNA-seq methods however required relatively large amounts of total RNA that were impractical to obtain from early embryos. That is, the sequential ligation of adapters onto the hydroxyl and monophosphate groups at the respective 3' and 5' termini of sRNAs followed by reverse transcription and amplification during conventional sRNA-seq library preparation protocols required ≥500 ng of total RNA, which is approximately 100 times more than can be obtained from early *Arabidopsis* embryos. More recent sRNA-seq methods can profile sRNAs from as low as single cells, but do not enrich for sRNAs to the same extent as conventional methods (Faridani et al., 2016). Therefore, to enable the profiling of miRNAs present in developing *Arabidopsis* embryos, we developed a method employing the NEBNext Multiplex Small RNA Library Prep Set for Illumina kit (NEB) to be suitable for the low amounts of total RNA obtainable from early embryos (i.e. 1-5 nanograms (ng)). In brief, polyacrylamide gel-based size-selection methods were included to both enrich for sRNAs from total RNA before the first adapter ligation step, as well as to enrich for desired sRNA cDNAs after final PCR amplification (see Methods for details). Also the amounts of 3' adapters were reduced, reverse transcriptase primers and 5' adapters were used in the NEBNext kit when starting with ≤500 ng of total RNA.

Sequencing data from libraries generated with 500, 50, 5, 1 or 0.5 ng of total RNA isolated from bent cotyledon stage Col-0 (hereafter referred to as wild-type) embryos were compared to determine how well the method enriches for sRNAs, as well as the method's reproducibility and accuracy when starting with different amounts of total RNA. Approximately 21-nt miRNAs and 24-nt small interfering RNAs that typically begin respectively with uridine- and adenosine-monophosphates, are characteristic features of plant sRNA populations (Borges and Martienssen, 2015). As expected for plant sRNAs, libraries generated from all input amounts of total RNA predominantly consisted of 21-24-base reads with the first position of the 21- and 24-base reads enriched for thymine and adenine, respectively. The distribution of sRNA-seq read sizes and 5' nt biases therefore indicated that the sRNA-seq protocol highly enriches for sRNAs from as low as 0.5 ng of total RNA. To determine the reproducibility of the method across various amounts of input RNA, miRNA family levels between libraries constructed from 500 ng of total RNA were compared with those generated from either 50, 5, 1 or 0.5 ng of total RNA. miRNA levels were highly correlated between biological replicate libraries generated from 500 ng (Pearson's R >0.99). Pearson's correlation coefficients were >0.9 between 500 ng libraries and all libraries generated with ≥1 ng of total RNA. The accuracy of this low-input sRNA-seq method across the dilution series of input RNA was also assessed by adding exogenous sRNA oligonucleotides (i.e. spike-ins) (Lutzmayer et al., 2017) during RNA isolation prior to library construction, and then examined spike-in levels in the resulting sRNA-seq datasets.

If the method accurately quantified sRNA levels, then a high correlation between the absolute number of spike-in molecules added and the number of sRNA-seq reads mapping to the spike-ins was expected. Pearson's correlation coefficients between the absolute amounts of spike-ins added and the relative amounts of spike-ins sequenced were >0.9 for all libraries generated from ≥1 ng total RNA. The progressive increase in the number of undetected miRNA families and sRNA spike-ins as total RNA amounts decreased indicated that the sensitivity of the method was reduced when starting with less than 50 ng of total RNA. Regardless, the modified sRNA-seq library construction method allowed to highly enrich for sRNAs, and both reproducibly and accurately quantify miRNA levels when starting with 1-5 ng of total RNA, which are amounts obtainable from early *Arabidopsis* embryos.

Embryonic miRNA Dynamics

This low-input sRNA-seq method was then used to generate libraries with total RNA isolated from embryos at eight developmental stages including three main phases of embryogenesis (Hofmann et al., 2019). Three pools of 50 embryos were isolated from each of the eight stages and considered biological replicates (1,200 embryos in total). At least 80% of the total RNA isolated from each biological replicate was used to generate sRNA-seq libraries and the remainder was used to generate full-length cDNAs to profile either transcriptomes (Hofmann et al., 2019) or miRNA-mediated cleavage products (see below). Previous analysis of mRNA-seq libraries generated from the same pools of total RNA demonstrated that the embryonic RNA samples were not significantly contaminated with non-embryonic RNAs, which has been a frequent problem in early embryonic *Arabidopsis* transcriptome datasets (Hofmann et al., 2019; Schon and Nodine, 2017). Total miRNA levels fluctuated in wild-type embryos according to their developmental stage, but were almost completely lost in dicer-like1-5 (dcl1-5) null mutants. Because DCL1 is required for miRNA biogenesis (Park et al., 2002; Reinhart et al., 2002), this further supported the validity of the miRNAs identified in the sRNA-seq libraries. Principal component analysis of miRNA family levels in libraries generated from embryonic and post-embryonic tissues demonstrated that biological replicates clustered together. Furthermore, the developmental stages of the embryonic samples were stratified along the second principal component, and were clearly separated from the post-embryonic leaf and flower samples. By applying the low-input sRNA-seq method to developing embryos, it was therefore possible to generate high-quality profiles of embryonic miRNAs, which changed in composition across developmental stages.

349 miRNAs belonging to 259 families in at least one embryonic stage were detected. 59 miRNA families detected with an average of ≥10 reads per million genome-matching reads (RPM) in at least one embryonic stage was then selected to examine in greater detail. Three groups of miRNAs with similar dynamics across embryogenesis were observed. Twenty-two miRNA families increased during the late transition phase and persisted in mature green embryos. These included miR394, miR403 and miR170/171, as well as miR167 and miR390 which were both previously detected in late-stage embryos with whole-mount in situ hybridizations (Ghosh Dastidar et al., 2016). Another set of 25 miRNA families, including miR156/157, miR161, miR164 and miR319 accumulated during the transition phase but then were reduced in mature embryos. Twelve miRNA families had relatively high levels during early embryogenesis and decreased thereafter. Based on further analysis of internally generated and publicly available sRNA-seq data from 26 tissue-types (Xu et al., 2018), five miRNA families were highly enriched during the initial stages of embryogenesis including miR156b-3p, miR831, miR845, miR866-3p and miR3440b-3p.

To examine whether miRNA levels vary between early embryonic cell-types, we adapted a sRNA in situ protocol (Ghosh Dastidar et al., 2016) to detect four selected miRNAs in early embryos. Consistent with previous reports (Nodine and Bartel, 2010), miR156 was localized throughout wild-type embryos and a similar pattern was also observed for miR159. miR165/166 confers repressive activities in the peripheral cell-types of embryos (McConnell et al., 2001; Miyashima et al., 2013; Smith and Long, 2010) and miR166 levels were accordingly higher in these outer cell-types. In contrast, miR160 levels were higher in the innermost vascular precursor cells. sRNA in situs performed with probes antisense to the mouse-specific miR124 miRNA produced low signal compared to probes antisense to the four miRNAs in wild-type embryos or embryos with wild-type morphologies from dcl1-5/+ self-pollinated plants (i.e. wild-type or dcl1-5/+ embryos). Moreover, probes antisense to the four miRNAs produced highly decreased signals when applied to miRNA-deficient dcl1-5 embryos compared to wild-type or dcl1-5/+ embryos. These controls further support the specificity of the signal observed from the miRNA in situ hybridizations.

Identification of Embryonic miRNA Targets

Based on the present analyses, embryonic miRNA populations were distinct from those in post-embryonic tissues and their levels frequently exhibited dynamic changes across developmental stages and sometimes cell-types. These results suggested that miRNAs have distinct functions during different phases of embryogenesis. Because miRNA functions are largely defined by the targets they regulate, the targets of embryonic miRNAs were next determined. In plants, miRNAs typically bind to highly complementary binding sites within target RNAs and mediate their endonucleolytic cleavage (Jones-Rhoades and Bartel, 2004; Kasschau et al., 2003; Llave et al., 2002). miRNA-mediated cleavage of target RNAs produces cleavage products downstream of the slice site, which can be cloned and sequenced with high-throughput methods referred to as PARE (parallel analysis of RNA ends) or degradome sequencing (Addo-Quaye et al., 2008; German et al., 2008; Gregory et al., 2008). Although these ground-breaking technologies have allowed miRNA target identification on a genome-wide scale, they required ≥10,000-fold more input RNA than what was obtainable from early Arabidopsis embryos. The nanoPARE method enabled the confident identification of miRNA-mediated target RNA cleavage products from low-input RNA (Schon et al., 2018). To identify embryonic miRNA targets, nanoPARE libraries from the same eight stages of embryogenesis used for miRNA profiling in biological triplicates were therefore generated. In addition to these 24 libraries from wild-type embryos, nanoPARE libraries from three biological replicates of dcl1-5 globular embryos as controls were also generated.

The nanoPARE datasets and target predictions for 164 miRNAs detected ≥1 RPM in ≥1 embryonic stage were used as input for the EndCut software (Schon et al., 2018) and 115 significant individual target transcript cleavage sites in developing embryos were identified in ≥1 library (Benjamini-Hochberg adjusted P-values<0.05). These 115 target sites included 59 sites that were identified in ≥2 biological replicates from ≥1 developmental stage (i.e. high-confidence targets) for 22 miRNA families that were characterized further. The first positions of nanoPARE reads mark RNA 5' ends and it was found that nanoPARE reads at the 59 high-confidence target sites detected in wild-type embryos were significantly reduced 40.5-fold in miRNA-deficient dcl1-5 globular embryos (P-value<0.0001; two-tailed K-S test). Moreover, no high-confidence targets were detected in dcl1-5 embryos and 58/59 of the high-confidence targets detected in developing wild-type embryos had decreased nanoPARE reads in dcl1-5 embryos. A lack of signal in dcl1-5 embryos could be explained by either a loss of miRNA-mediated cleavage or technical differences in sample RNA quality. To differentiate between these two explanations, we measured nanoPARE signal mapping to published transcription start sites (Schon et al., 2018) of all high-confidence targets detected in globular embryos. Full-length transcripts were more abundant in dcl1-5 embryos for 17/20 of these high-confidence targets, demonstrating that the observed reduction of nanoPARE signal at miRNA-directed cleavage sites in dcl1-5 embryos was not due to differences in RNA quality. The loss of miRNA-mediated cleavage sites in miRNA-deficient dcl1-5 embryos further supports the validity of the miRNA targets identified.

miRNA-mediated cleavage products dynamically accumulated and were generally more abundantly detected during mid-embryogenesis. To test whether there are sites enriched in embryos, nanoPARE libraries generated either previously from flowers and floral organs were also analyzed (Schon et al., 2018), or in this study from root or shoot tissues of xrn4-5 mutants which stabilize miRNA-directed cleavage products (German et al., 2008; Souret et al., 2004). We observed 11 high-confidence target transcripts enriched in developing embryos including those encoding the EMB2654 (miR161.2) and SPY (miR158) tetratricopeptide repeat proteins respectively involved in embryogenesis and gibberellic acid responses, an ATP synthase delta subunit (ATPD; miR159), aplant invertase/methylesterase inhibitor family protein (AT5G64640; miR156/157), and TCP4 and TCP24 (miR319) transcription factors. In fact, 30/59 high-confidence targets encoded transcription factors, and a few cleavage products exhibited interesting developmental dynamics. For example, miR164:CUP-SHAPED COTYLEDON 2 (CUC2) and miR824:AGAMOUS-LIKE 16 (AGL16) cleavage products accumulated during mid-embryogenesis when miRNA and target levels were increasing and decreasing, respectively. Similarly, miR403:ARGONAUTE 2 (AGO2) products had relatively high levels during mid-embryogenesis when increasing miR403 levels were concomitant with decreasing AGO2 levels.

Impact of miRNAs on the Embryonic Transcriptome

To assess how miRNAs influence embryonic transcript levels, transcriptomes from dcl1-5 globular embryos were profiled in which miRNA levels and cleavage activities were highly reduced. Principal component analysis of dcl1-5 and wild-type embryonic transcriptomes (Hofmann et al., 2019) revealed that dcl1-5 biological triplicates clustered together in a group that was separate from the wild-type transcriptomes. This suggested that the loss of miRNAs resulted in large-scale changes in transcript populations. Indeed, 2,055 and 830 genes had at least two-fold significantly increased and decreased transcript levels in dcl1-5 relative to wild-type globular embryos, respectively (DESeq2; Benjamini-Hochberg adjusted P-values<0.01). Considering that 18,420 genes had ≥1 TPM in either wild-type or dcl1-5 globular embryos, this indicated that >15% of the transcriptome is significantly altered in dcl1-5 embryos.

Differences due to RNA contamination from non-embryonic seed tissues could be ruled out by applying the tissue-enrichment test (Schon and Nodine, 2017), which revealed no significant RNA contamination in either the wild-type or dcl1-5 samples. These large-scale transcriptome changes may be related to the precocious activation of embryo maturation gene expression programs as previously reported (Nodine and Bartel, 2010; Willmann et al., 2011). To test whether transcriptomes from dcl1-5 globular embryos resembled those from later stages of development, we examined the levels of transcripts that were specifically enriched during one of four main phases of embryogenesis and seed development (Hofmann et al., 2019) in dcl1-5 compared to wild-type globular embryos. Transition, mature green and dry seed phase marker transcripts were significantly increased (P-values<$10^{-6}$, two-tailed K-S tests) indicating that miRNA-deficient dcl1-5 embryos indeed prematurely activate late-stage gene expression programs.

Because we detected relatively few miRNA targets with nanoPARE compared to the total number of differentially expressed genes, we reasoned that either many miRNA targets were not detected with nanoPARE or that the large-scale changes in dcl1-5 transcriptomes were mostly a consequence of miRNA target de-repression. Plant miRNA targets can be predicted at various confidence levels depending on the frequency and position of the miRNA:target duplex mismatches (i.e. Allen scores) (Allen et al., 2005). Whereas miRNA targets detected with nanoPARE were significantly increased in dcl1-5 relative to wild-type embryos compared to all expressed genes (2.8-fold; P-value=$3.96 \times 10^{-11}$, two-tailed K-S test), targets confidently predicted computationally (i.e. Allen scores ≤2 or ≤4), including bona fide post-embryonic targets, were not substantially increased in dcl1-5. These results are consistent with the loss of miRNAs in dcl1-5 embryos resulting in the loss of cleavage and repression of dozens of targets, and the consequential mis-regulated miRNA target activities having a large impact on embryonic gene expression programs.

Thirty of the fifty-nine high-confidence miRNA targets detected with nanoPARE encoded transcription factors belonging to eight different families including those containing ARF, GRAS, HD-ZIP, MADS-box, MYB, NAC, SBP and TCP domains. Twenty-eight of these had transcripts >1 TPM in either wild-type or dcl1-5 globular embryos, and remarkably twenty-four (85.7%) were significantly up-regulated in dcl1-5 compared to wild-type embryos. RNA in situ hybridizations of three miR165/166 target RNAs encoding class III HD-ZIP transcription factors (i.e. PHABULOSA (PHB), CORONA (CNA) and PHAVOLUTA (PHV)) in wild-type embryos were congruous with previous reports (McConnell et al., 2001; Prigge et al., 2005; Smith and Long, 2010) and transcriptome analyses (Hofmann et al., 2019). Consistent with their up-regulation in dcl1-5 embryos, PHB, CNA and PHV transcripts had increased signal throughout embryos including ectopic localization in the basal and peripheral regions of dcl1-5 embryos. Together with the observation that miR165/166 and its target transcripts had opposite localization patterns in heart-staged wild-type embryos, the ectopic localization of class III HD-ZIP transcripts further supports that miR165/166 helps define the proper localization patterns of their target transcription factors.

MiRNA—Mediated Repression of Transcription Factors is Required for Embryo Morphogenesis Embryonic miRNAs direct the cleavage and repression of at least thirty transcripts encoding transcription factors. This appears to help define transcription factor spatiotemporal domains and likely has a large impact on embryonic transcriptional regulatory networks including those that help define the future plant body plan (Nodine and Bartel, 2010; Seefried et al., 2014). To determine how miRNA-mediated cleavage of transcripts encoding transcription factors contributes to embryo morphogenesis, six miRNA:target interactions were selected to study further including miR156/157:SQUAMOSA PROMOTER BINDING PROTEIN-LIKE 10 (SPL10), miR156/157:SPL11, miR160:AUXIN RESPONSE FACTOR 17 (ARF17), miR165/166:PHB, miR167:ARF8 and miR319:TCP4.

The target loci were cloned, including upstream and downstream intergenic sequences, and performed site-directed mutagenesis to introduce synonymous mutations in the corresponding miRNA target sites in order to abolish miRNA binding and generate transgenic targets resistant to miRNA-mediated cleavage (i.e. resistant targets). To control for potential effects unrelated to the disruption of the miRNA binding sites, also constructs were generated whereby the miRNA binding sites were left intact (i.e. genomic targets). The resistant and genomic target constructs were transformed into wild-type plants, and selected 6-17 independent transgenic lines for each. Post-embryonic phenotypes of resistant target lines were consistent with previous reports (Mallory et al., 2005; Wu et al., 2009, 2006). To characterize these transgenic lines further, quantitative RT-PCR (qRT-PCR) was performed on target transcripts in floral buds from wild-type, or their respective genomic and resistant target lines. Significantly higher transcript levels were observed in all sets of resistant lines relative to wild-type and corresponding genomic target control lines (P-values<0.001 and 0.05, respectively; t-tests).

Based on the qRT-PCR analyses, two representative lines for each construct were selected to examine for embryo abnormalities. Because most of the resistant target lines were sterile and had abnormal flower morphologies, wild-type mothers were crossed with fathers that were either wild-type, or transgenic miRNA-resistant or control target lines to determine whether specific miRNA/target interactions were required for embryo morphogenesis. More precisely, ovules were fixed and cleared 120 hours after pollination, and inspected the resulting embryo morphologies with Nomarski microscopy. Strikingly, all crosses between wild-type mothers and resistant target lines yielded significantly more abnormal embryos than wild-type mothers crossed with either wild-type or genomic target control line fathers (P-values<0.001 and <0.01, respectively; Fisher's exact test). None of the genomic control line crosses had significantly more abnormal embryos relative to wild-type. Moreover, different resistant targets generated distinct embryonic phenotypes including abnormal cell divisions in either basal regions of the embryo (i.e. hypophysis and suspensors) (rSPL10 and rSPL11), embryo propers (rARF17), embryo propers and suspensors (rARF8 and rPHB), or cotyledon growth defects (rTCP4).

Importantly, these characteristic phenotypes were reproducible between independent transgenic lines. Therefore, specific interactions between miRNAs and transcripts encoding transcription factors are morphologically required in a variety of embryonic cell-types.

DISCUSSION

A sRNA-seq library preparation protocol was developed that can be used to highly enrich for sRNAs, as well as reproducibly and accurately measure their levels from low amounts of total RNA (i.e. ≥1 ng). This method was expected to be useful for profiling sRNA populations from difficult-to-obtain samples including plant and animal reproductive tissues. Here, this low-input sRNA-seq method was used to profile sRNA populations across *Arabidopsis* embryogenesis. In general, the sRNA-seq and nanoPARE datasets reported in this study, as well as the transcriptome datasets produced from the same stages (Hofmann et al., 2019), provide a solid foundation for the characterization of non-coding and coding RNA populations in plant embryos. For example, miRNAs comprise only a fraction of the embryonic sRNA population, and these integrated sRNA-seq, nanoPARE and mRNA-seq datasets also enables the systematic characterization of additional sRNAs present in early embryos including small interfering RNAs that may be involved in the establishment of epigenetic marks and associated transcriptional gene silencing events.

In this study, a catalog of 354 miRNAs present during embryogenesis was generated and the recently developed nanoPARE method was applied to identify 59 high-confidence embryonic miRNA targets. High-confidence miRNA-directed cleavage products were found for only 22/115 miRNAs detected at ≥1 RPM in at least one stage suggesting that many miRNAs may not be directing target cleavage in the stages and conditions examined. Although this could be partially explained by limited sensitivity of the nanoPARE method, the observation that targets detected by nanoPARE, but not those confidently predicted computationally, had globally increased transcript levels in dcl1-5 embryos suggested that the majority of cleavage events had been identified. Moreover, miRNA-directed cleavage products of all targets with published evidence were detected supporting their existence during *Arabidopsis* embryogenesis as described below. It is proposed that many of the detected miRNAs function as fail-safes to prevent the aberrant accumulation of target transcripts or have already executed their functions during earlier stages of development. For instance, targets for any of the five miRNA families that were abundant and enriched at the earliest stages of embryogenesis could not have been detected. These miRNAs decreased dramatically during early embryogenesis and it is proposed that they function directly after fertilization and prior to the earliest stage sampled (i.e. preglobular or 8-cell/16-cell stage). miRNAs for which targets were not detected may also recognize their targets through mechanisms that are not accounted for by miRNA target computational predictions. For example, miR156/157:AT5G64640, miR158:SPY, and miR159:ATPD sites have relatively poor miRNA:target RNA duplex complementarities and are consequently predicted to be unlikely targets (i.e. Allen scores ≥5). Although future characterization of these embryo-enriched miRNA-directed cleavage events is required to determine their functional relevance, all three cleavage products were robustly detected specifically during embryogenesis suggesting that the full spectrum of miRNA targets remains to be identified even in *Arabidopsis* for well-characterized and highly conserved miRNAs.

As a proof-of-principle of this resource's utility, it was focused on the miRNA-mediated regulation of transcription factors in the current study. It was demonstrated that miR-NAs were required for pattern formation and proper developmental timing of gene expression programs during *Arabidopsis* embryogenesis (Nodine and Bartel, 2010; Seefried et al., 2014; Willmann et al., 2011). Indeed, the more comprehensive dcl1-5 embryo transcriptome dataset and analyses presented here further supports that miRNAs have a large impact on the embryonic transcriptome including the prevention of precocious expression of genes characteristic of the maturation phase of embryogenesis and related to oil body biogenesis, lipid storage and other seed maturation processes (Hofmann et al., 2019). Because <5% of the transcripts significantly increased in dcl1-5 embryos were directly cleaved and repressed by miRNAs, we suggest that the vast majority of mis-regulated genes in dcl1-5 embryos are downstream of miRNA targets. Interestingly, 30 of the 59 embryonic miRNA high-confidence targets identified encode transcription factors and their de-repression in miRNA-deficient dcl1-5 embryos, along with associated mis-regulated downstream transcriptional cascades, may largely explain why thousands of transcripts have different levels in dcl1-5 compared to wild-type embryos.

Together with previous studies, the present results indicate that multiple miRNAs are required for embryo morphogenesis and pattern formation. It was demonstrated that miR156 prevents the accumulation of SPL transcription factors and the resulting expression of maturation phase genes during early embryogenesis (Nodine and Bartel, 2010). Although, decreased SPL10/11 levels could suppress miRNA-deficient dcl1-5 phenotypes, abolishing miR156: SPL10/11 interactions were not sufficient to phenocopy dcl1-5 embryos. This suggests that additional miRNA:target interactions are required for embryonic pattern formation. Consistent with this idea, the phenotypes of embryos with mir160a loss-of-function mutations (Liu et al., 2010) or expressing miR160-resistant ARF17 transgenes indicated that miR160-mediated repression of the ARF17 transcription factor is required for proper cell division patterns in the embryo proper. Seedling (Palatnik et al., 2003) and embryo phenotypes of plants expressing miR319-resistant TCP4 transcription factor transgenes demonstrated that miR319: TCP4 interactions are required for proper cotyledon formation. Previous results, as well as the characterization of miR165/166 and their target HD-ZIP transcript localization patterns, indicated that miR165/166 helps define HD-ZIP transcription factor localization domains in early embryos (McConnell et al., 2001; Miyashima et al., 2013; Smith and Long, 2010). Consistent with miR165/166-directed spatial restriction of HD-ZIP transcription factors being required for embryonic pattern formation, embryos expressing the miR165/166-resistant PHB transcription factor exhibited abnormal divisions. Interestingly, the morphological defects observed in rARF8 embryos are consistent with previous reports that miR167:ARF8 interactions are required in the maternal sporophytic tissues for proper embryogenesis (Wu et al., 2006; Yao et al., 2019). However, miR167 and miR167:ARF8 cleavage products were nearly eliminated in dcl1-5 embryos derived from self-fertilized dcl1-5/+ plants, suggesting that the activities of zygotically produced miR167 are required for embryo morphogenesis. The identification of miR170/171-and miR394-directed cleavage of transcripts respectively encoding either the HAM1 transcription factor or LCR F-box protein is also consistent with previous reports (Knauer et al., 2013; Takanashi et al., 2018). Altogether, these data support a model whereby the post-transcriptional regulation of transcription factor gene-regulatory networks by several miRNAs is critically important for the establishment of the plant body plan during early embryogenesis. The resources and phenotypes described in this study therefore provide multiple entry points to further characterize how the miRNA-mediated repression of transcripts, including those encoding for transcription factors, contributes to the initial cellular differentiation events operating at the beginning of plant life.

REFERENCES

Addo-Quaye C, Eshoo T W, Bartel D P, Axtell M J. 2008. Endogenous siRNA and miRNA targets identified by sequencing of the *Arabidopsis* degradome. *Current Biology* 18: 758-762.

Allen E, Xie Z, Gustafson A M, Carrington J C. 2005. microRNA-Directed Phasing during Trans-Acting siRNA Biogenesis in Plants. *Cell* 121: 207-221.

Andersson R, Gebhard C, Miguel-Escalada I, Hoof I, Bornholdt J, Boyd M, Chen Y, Zhao X, Schmidl C, Suzuki T, et al. 2014. An atlas of active enhancers across human cell types and tissues. *Nature* 507: 455-461.

Arguel M-J, LeBrigand K, Paquet A, Ruiz Garcia S, Zaragosi L-E, Barbry P, Waldmann R. 2017. A cost effective 5' selective single cell transcriptome profiling approach with improved UMI design. *Nucleic Acids Research* 45: e48-e48.

Bartel D P. 2004. MicroRNAs: genomics, biogenesis, mechanism, and function. *Cell* 116: 281-297.

Becher V, Heiber P A. 2012. A linearly computable measure of string complexity. *Theoretical Computer Science* 438: 62-73.

Borges F, Martienssen R A. 2015. The expanding world of small RNAs in plants. *Nature Publishing Group* 16: 727-741.

Brennecke P, Anders S, Kim J K, Kolodziejczyk A A, Zhang X, Proserpio V, Baying B, Benes V, Teichmann S A, Marioni J C, et al. 2013. Accounting for technical noise in single-cell RNA-seq experiments. *Nat Meth* 10: 1093-1095.

Carlsbecker A, Lee J-Y, Roberts C J, Dettmer J, Lehesranta S, Zhou J, Lindgren O, Moreno-Risueno M A, Vatén A, Thitamadee S, et al. 2010. Cell signalling by microRNA165/6 directs gene dose-dependent root cell fate. *Nature* 465: 316-321.

Cheng Z, Otto G M, Powers E N, Keskin A, Mertins P, Carr S A, Jovanovic M, Brar G A. 2018. Pervasive, Coordinated Protein-Level Changes Driven by Transcript Isoform Switching during Meiosis. *Cell* 172: 910-914.e16.

Clark J M. 1988. Novel non-templated nucleotide addition reactions catalyzed by procaryotic and eucaryotic DNA polymerases. *Nucleic Acids Research* 16: 9677-9686.

Cloonan N, Forrest A R R, Kolle G, Gardiner B B A, Faulkner G J, Brown M K, Taylor D F, Steptoe A L, Wani S, Bethel G, et al. 2008. Stem cell transcriptome profiling via massive-scale mRNA sequencing. *Nat Meth* 5: 613-619.

Cocquet J, Chong A, Zhang G, Veitia R A. 2006. Reverse transcriptase template switching and false alternative transcripts. *Genomics* 88: 127-131.

Cole C, Byrne A, Beaudin A E, Forsberg E C, Vollmers C. 2018. Tn5Prime, a Tn5 based 5' capture method for single cell RNA-seq. *Nucleic Acids Research* 1-12.

Creasey K M, Zhai J, Borges F, Van Ex F, Regulski M, Meyers B C, Martienssen R A. 2014. miRNAs trigger widespread epigenetically activated siRNAs from transposons in *Arabidopsis*. *Nature* 508: 411-415.

Cumbie J S, Ivanchenko M G, Megraw M. 2015. NanoCAGE-XL and CapFilter: an approach to genome wide identification of high confidence transcription start sites. *BMC Genomics* 1-13.

Davuluri R V, Suzuki Y, Sugano S, Plass C, Huang T H M. 2008. The functional consequences of alternative promoter use in mammalian genomes. *Trends in Genetics* 24: 167-177. de Rie D, Abugessaisa I, Alam T, Arner E, Arner P, Ashoor H, Aström G, Babina M, Bertin N, Burroughs A M, et al. 2017. An integrated expression atlas of miRNAs and their promoters in human and mouse. *Nat Biotechnol* 35: 872-878.

Dieci G, Preti M, Montanini B. 2009. Eukaryotic snoRNAs: A paradigm for gene expression flexibility. *Genomics* 94: 83-88.

Dobin A, Davis C A, Schlesinger F, Drenkow J, Zaleski C, Jha S, Batut P, Chaisson M, Gingeras T R. 2012. STAR: ultrafast universal RNA-seq aligner. *Bioinformatics* 29: 15-21. Faridani, O. R., Abdullayev, I., Hagemann-Jensen, M., Schell, J. P., Lanner, F., and Sandberg, R. (2016). Single-cell sequencing of the small-RNA transcriptome. *Nature Biotechnology* 34, 1264-1266.

Faulkner G J, Forrest A R R, Chalk A M, Schroder K, Hayashizaki Y, Carninci P, Hume D A, Grimmond S M. 2008. A rescue strategy for multimapping short sequence tags refines surveys of transcriptional activity by CAGE. *Genomics* 91: 281-288.

Filipowicz W, Pogačić V. 2002. Biogenesis of small nucleolar ribonucleoproteins. *Curr Opin Cell Biol* 14: 319-327.

Gasciolli V, Mallory A C, Bartel D P, Vaucheret H. 2005. Partially Redundant Functions of *Arabidopsis* DICER-like Enzymes and a Role for DCL4 in Producing trans-Acting siRNAs. *Current Biology* 15: 1494-1500.

German M A, Pillay M, Jeong D-H, Hetawal A, Luo S, Janardhanan P, Kannan V, Rymarquis L A, Nobuta K, German R, et al. 2008. Global identification of microRNA-target RNA pairs by parallel analysis of RNA ends. *Nat Biotechnol* 26: 941-946.

Ghosh Dastidar, M., Mosiolek, M., Bleckmann, A., Dresselhaus, T., Nodine, M. D., and Maizel, A. (2016). Sensitive whole mount in situ localization of small RNA s in plants. *Plant J.* 88, 694-702.

Granneman S, Petfalski E, Tollervey D. 2011. A cluster of ribosome synthesis factors regulate pre-*rRNA folding and 5.8S rRNA maturation by the Rat1 exonuclease. *The EMBO Journal* 30: 4006-4019.

Gregory B D, O'Malley R C, Lister R, Urich M A, Tonti-Filippini J, Chen H, Millar A H, Ecker J R. 2008. A Link between RNA Metabolism and Silencing Affecting *Arabidopsis* Development. *Developmental Cell* 14: 854-866.

Grohmann K, Amairic F, Crews S, Attardi G. 1978. Failure to detect "cap" structures in mitochondrial DNA-coded poly(A)-containing RNA from HeLa cells. *Nucleic Acids Research* 5: 637-651.

Haberle V, Li N, Hadzhiev Y, Plessy C, Previti C, Nepal C, Gehrig J, Dong X, Akalin A, Suzuki A M, et al. 2014. Two independent transcription initiation codes overlap on vertebrate core promoters. *Nature* 507: 381-385.

Harbers M, Kato S, de Hoon M, Hayashizaki Y, Carninci P, Plessy C. 2013. Comparison of RNA—or LNA-hybrid oligonucleotides in template-switching reactions for high-speed sequencing library preparation. *BMC Genomics* 14: 665-6.

Hashimoto T, de Hoon M J L, Grimmond S M, Daub C O, Hayashizaki Y, Faulkner G J. 2009. Probabilistic resolution of multi-mapping reads in massively parallel sequencing data using MuMRescueLite. *Bioinformatics* 25: 2613-2614.

Henderson I R, Zhang X, Lu C, Johnson L, Meyers B C, Green P J, Jacobsen S E. 2006. Dissecting *Arabidopsis thaliana* DICER function in small RNA processing, gene silencing and DNA methylation patterning. *Nat Genet* 38: 721-725.

Henras A K, Plisson-Chastang C, O'Donohue M-F, Chakraborty A, Gleizes P-E. 2015. An overview of pre-ribosomal RNA processing in eukaryotes. *WIREs RNA* 6: 225-242.

Hofmann, F., Schon, M. A., and Nodine, M. D. (2019). The embryonic transcriptome of *Arabidopsis thaliana*. Plant Reprod. 32, 77-91.

Hon C-C, Ramilowski J A, Harshbarger J, Bertin N, Rackham O J L, Gough J, Denisenko E, Schmeier S, Poulsen™, Severin J, et al. 2017. An atlas of human long non-coding RNAs with accurate 5' ends. *Nature* 543: 199-204.

Hopper A K, Pai D A, Engelke D R. 2010. Cellular dynamics of tRNAs and their genes. *FEBS Letters* 584: 310-317.

Hou C Y, Lee W C, Chou H C, Chen A P, Chou S J, Chen H-M. 2016. Global Analysis of Truncated RNA Ends Reveals New Insights into Ribosome Stalling in Plants. *The Plant cell* 28: 2398-2416.

Howell M D, Fahlgren N, Chapman E J, Cumbie J S, Sullivan C M, Givan S A, Kasschau K D, Carrington J C. 2007. Genome-Wide Analysis of the RNA-DEPENDENT RNA POLYMERASE6/DICER-LIKE4 Pathway in *Arabidopsis* Reveals Dependency on miRNA—and tasiRNA—Directed Targeting. *The Plant Cell* 19: 926-942.

Islam S, Kjallquist U, Moliner A, Zajac P, Fan J B, Lonnerberg P, Linnarsson S. 2011. Characterization of the single-cell transcriptional landscape by highly multiplex RNA-seq. *Genome Research* 21: 1160-1167.

Islam S, llquist U K A, Moliner A, Zajac P, Fan J-B, nnerberg P L O, Linnarsson S. 2012. Highly multiplexed and strand-specific single-cell RNA 5′ end sequencing. *Nat Protoc* 7: 813-827.

Islam S, Zeisel A, Joost S, La Manno G, Zajac P, Kasper M, Lönnerberg P, Linnarsson S. 2013. Quantitative single-cell RNA-seq with unique molecular identifiers. *Nat Meth* 11: 163-166.

Jones-Rhoades M W, Bartel D P. 2004. Computational Identification of Plant MicroRNAs and Their Targets, Including a Stress-Induced miRNA. *Molecular Cell* 1-13.

Karlsson K, Lönnerberg P, Linnarsson S. 2017. Alternative TSSs are co-regulated in single cells in the mouse brain. *Mol Syst Biol* 13: 930-10.

Kasschau K D, Xie Z, Allen E, Llave C, Chapman E J, Krizan K A, Carrington J C. 2003. P1/HC-Pro, a viral suppressor of RNA silencing, interferes with *Arabidopsis* development and miRNA unction. *Developmental Cell* 4: 205-217.

Kastenmayer J P, Green P J. 2000. Novel features of the XRN-family in *Arabidopsis*: evidence that AtXRN4, one of several orthologs of nuclear Xrn2p/Rat1p, functions in the cytoplasm. *Proceedings of the National Academy of Sciences of the United States of America* 97: 13985-13990.

Kharytonchyk S, Monti S, Smaldino P J, Van V, Bolden N C, Brown J D, Russo E, Swanson C, Shuey A, Telesnitsky A, et al. 2016. Transcriptional start site heterogeneity modulates the structure and function of the HIV-1 genome. *Proceedings of the National Academy of Sciences of the United States of America* 113: 13378-13383.

Kidner C A, Martienssen R A. 2004. Spatially restricted microRNA directs leaf polarity through ARGONAUTE1. *Nature* 428: 81-84.

Knauer S, Holt A L, Rubio-Somoza I, Tucker E J, Hinze A, Pisch M, Javelle M, Timmermans M C, Tucker M R, Laux T. 2013. A protodermal miR394 signal defines a region of stem cell competence in the *Arabidopsis* shoot meristem. *Dev Cell* 24: 125-132.

Kozomara A, Griffiths-Jones S. 2013. miRBase: annotating high confidence microRNAs using deep sequencing data. *Nucleic Acids Research* 42: D68-D73.

Lamesch P, Berardini T Z, Li D, Swarbreck D, Wilks C, Sasidharan R, Muller R, Dreher K, Alexander D L, Garcia-Hernandez M, et al. 2012. The *Arabidopsis* Information Resource (TAIR): improved gene annotation and new tools. *Nucleic Acids Research* 40: D1202-10.

Legen J, Kemp S, Krause K, Profanter B, Herrmann R G, Maier R M. 2002. Comparative analysis of plastid transcription profiles of entire plastid chromosomes from tobacco attributed to wild-type and PEP-deficient transcription machineries. *Plant J* 31: 171-188.

Liu, X., Huang, J., Wang, Y., Khanna, K., Xie, Z., Owen, H. A., and Zhao, D. (2010). The role of floral organs in carpels, an *Arabidopsis* loss-of-function mutation in MicroRNA160a, in organogenesis and the mechanism regulating its expression. *Plant J.* 62, 416-428.

Llave C, Xie Z, Kasschau K D, Carrington J C. 2002. Cleavage of Scarecrow-like mRNA targets directed by a class of *Arabidopsis* miRNA. *Science* 297: 2053-2056.

Love M I, Huber W, Anders S. 2014. Moderated estimation of fold change and dispersion for RNA-seq data with DESeq2. *Genome Biology* 15: 550-21.

Lutzmayer, S., Enugutti, B., and Nodine, M. D. (2017). Novel small RNA spike-in oligonucleotides enable absolute normalization of small RNA-Seq data. *Sci. Rep.* 7, 5913.

Mallory, A. C., Bartel, D. P., and Bartel, B. (2005). MicroRNA-directed regulation of *Arabidopsis* AUXIN RESPONSE FACTOR17 is essential for proper development and modulates expression of early auxin response genes. Plant Cell 17, 1360-1375.

Marcel M. 2011. Cutadapt removes adapter sequences from high-throughput sequencing reads. *EMBnetJournal* 17: 10-12.

Miyashima S, Honda M, Hashimoto K, Tatematsu K, Hashimoto T, Sato-Nara K, Okada K, Nakajima K. 2013. A comprehensive expression analysis of the *Arabidopsis* MICRORNA165/6 gene family during embryogenesis reveals a conserved role in meristem specification and a non-cell-autonomous function. *Plant and Cell Physiology* 1-30.

Monde R A, Schuster G, Stern D B. 2000. Processing and degradation of chloroplast mRNA. *Biochimie* 82: 573-582.

Morton T, Petricka J, Corcoran D L, Li S, Winter C M, Carda A, Benfey P N, Ohler U, Megraw M. 2014. Paired-end analysis of transcription start sites in *Arabidopsis* reveals plant-specific promoter signatures. *THE PLANT CELL ONLINE* 26: 2746-2760.

Nagarajan V K, Jones C I, Newbury S F, Green P J. 2013. XRN 5'-3' exoribonucleases: Structure, mechanisms and functions. *BBA—Gene Regulatory Mechanisms* 1829: 590-603.

Nodine M D, Bartel D P. 2010. MicroRNAs prevent precocious gene expression and enable pattern formation during plant embryogenesis. *Genes & Development* 24: 2678-2692.

Palatnik, J. F., Allen, E., Wu, X., Schommer, C., Schwab, R., Carrington, J. C., and Weigel, D. (2003). Control of leaf morphogenesis by microRNAs. *Nature* 425, 257-263.

Park, W., Li, J., Song, R., Messing, J., and Chen, X. (2002). CARPEL FACTORY, a Dicer homolog, and HEN1, a novel protein, act in microRNA metabolism in *Arabidopsis thaliana*. *Curr. Biol.* 12, 1484-1495.

Pelechano V, Wei W, Steinmetz L M. 2013. Extensive transcriptional heterogeneity revealed by isoform profiling. *Nature* 497: 127-131.

Picelli S, Björklund Å K, Faridani O R, Sagasser S, Winberg G, Sandberg R. 2013. Smart-seq2 for sensitive full-length transcriptome profiling in single cells. *Nat Meth* 10: 1096-1098.

Plessy C, Bertin N, Takahashi H, Simone R, Salimullah M, Lassmann T, Vitezic M, Severin J, Olivarius S, Lazarevic D, et al. 2010. Linking promoters to functional transcripts in small samples with nanoCAGE and CAGEscan. *Nat Meth* 7: 528-534.

Prigge, M. J., Otsuga, D., Alonso, J. M., Ecker, J. R., Drews, G. N., and Clark, S. E. (2005). Class III homeodomain-leucine zipper gene family members have overlapping, antagonistic, and distinct roles in *Arabidopsis* development. Plant Cell 17, 61-76.

Ramsköld D, Luo S, Wang Y-C, Li R, Deng Q, Faridani O R, Daniels G A, Khrebtukova I, Loring J F, Laurent L C, et al. 2012. Full-length mRNA-Seq from single-cell levels of RNA and individual circulating tumor cells. *Nat Biotechnol* 30: 777-782.

Reinhart, B. J., Weinstein, E. G., Rhoades, M. W., Bartel, B., and Bartel, D. P. (2002). MicroRNAs in plants. *Genes Dev.* 16, 1616-1626.

Salimullah M, Sakai M, Mizuho S, Plessy C, Carninci P. 2011. NanoCAGE: a high-resolution technique to discover and interrogate cell transcriptomes. *Cold Spring Harbor Protocols* 2011: pdb.prot5559-pdb.prot5559.

Schon, M. A., and Nodine, M. D. (2017). Widespread Contamination of *Arabidopsis* Embryo and Endosperm. Transcriptome Data Sets. Plant Cell 29, 608-617.

Smith, Z. R., and Long, J. A. (2010). Control of *Arabidopsis* apical-basal embryo polarity by antagonistic transcription factors. Nature 464, 423-426.

Seefried, W. F., Willmann, M. R., Clausen, R. L., and Jenik, P. D. (2014). Global Regulation of Embryonic Patterning in *Arabidopsis* by MicroRNAs. *Plant Physiol.* 165, 670-687.

Souret F F, Kastenmayer J P, Green P J. 2004. AtXRN4 Degrades mRNA in *Arabidopsis* and Its Substrates Include Selected miRNA Targets. *Molecular Cell* 15: 173-183.

Takanashi, H., Sumiyoshi, H., Mogi, M., Hayashi, Y., Ohnishi, T., and Tsutsumi, N. (2018). miRNAs control HAM1 functions at the single-cell-layer level and are essential for normal embryogenesis in *Arabidopsis*. Plant Molecular Biology 96, 627-640.

Tang D T P, Plessy C, Salimullah M, Suzuki A M, Calligaris R, Gustincich S, Carninci P. 2012. Suppression of artifacts and barcode bias in high-throughput transcriptome analyses utilizing template switching. *Nucleic Acids Research* 41: e44-e44.

Ushijima T, Hanada K, Gotoh E, Yamori W, Kodama Y, Tanaka H, Kusano M, Fukushima A, Tokizawa M, Yamamoto Y Y, et al. 2017. Light Controls Protein Localization through Phytochrome-Mediated Alternative Promoter Selection. *Cell* 171: 1316-1325.e12.

Wang J R, Quach B, Furey T S. 2017. Correcting nucleotide-specific biases in high-throughput sequencing data. *BMC Bioinformatics* 18: 357-10.

Wang J W, Czech B, Weigel D. 2009. miR156-regulated SPL transcription factors define an endogenous flowering pathway in *Arabidopsis thaliana*. Cell 138: 738-749.

Wang M J, Davis N W, Gegenheimer P. 1988. Novel mechanisms for maturation of chloroplast transfer RNA precursors. *The EMBO journal* 7: 1567-1574.

Wang Y, Wang X, Deng W, Fan X, Liu T-T, He G, Chen R, Terzaghi W, Zhu D, Deng X W. 2014. Genomic Features and Regulatory Roles of Intermediate-Sized Non-Coding RNAs in *Arabidopsis*. *Molecular Plant* 7: 514-527.

Williams L, Grigg S P, Xie M, Christensen S, Fletcher J C. 2005. Regulation of *Arabidopsis* shoot apical meristem and lateral organ formation by microRNA miR166g and its AtHD-ZIP target genes. *Development* 132: 3657-3668.

Willmann M R, Berkowitz N D, Gregory B D. 2014. Improved genome-wide mapping of uncapped and cleaved transcripts in eukaryotes—GMUCT 2.0. *Methods* 67: 64-73.

Wu G, Park M Y, Conway S R, Wang J W, Weigel D, Poethig R S. 2009. The sequential action of miR156 and miR172 regulates developmental timing in *Arabidopsis*. *Cell* 138: 750-759.

Wu M F, Tian Q, Reed J W. 2006. *Arabidopsis* microRNA167 controls patterns of ARF6 and ARF8 expression, and regulates both female and male reproduction. *Development* 133: 4211-4218.

Xu, L., Hu, Y., Cao, Y., Li, J., Ma, L., Li, Y., and Qi, Y. (2018). An expression atlas of miRNAs in *Arabidopsis thaliana*. Sci. China Life Sci. 61, 178-189.

Yao, X., Chen, J., Zhou, J., Yu, H., Ge, C., Zhang, M., Gao, X., Dai, X., Yang, Z.-N., and Zhao, Y. (2019). An Essential Role for miRNA167 in Maternal Control of Embryonic and Seed Development. *Plant Physiol.* 180, 453-464.

Yoshikawa M, Peragine A, Park M Y, Poethig R S. 2005. A pathway for the biogenesis of trans-acting siRNAs in *Arabidopsis*. *Genes & Development* 19: 2164-2175.

Yu X, Willmann M R, Anderson S J, Gregory B D. 2016. Genome-Wide Mapping of Uncapped and Cleaved Transcripts Reveals a Role for the Nuclear mRNA Cap-Binding Complex in Cotranslational RNA Decay in *Arabidopsis*. *The Plant cell* 28: 2385-2397.

Zhai J, Arikit S, Simon S A, Kingham B F, Meyers B C. 2014. Rapid construction of parallel analysis of RNA end (PARE) libraries for Illumina sequencing. *Methods* 67: 84-90.

Zhou Y, Honda M, Zhu H, Zhang Z, Guo X, Li T, Li Z, Peng X, Nakajima K, Duan L, et al. 2015. Spatiotemporal Sequestration of miR165/166 by *Arabidopsis* Argonaute10 Promotes Shoot Apical Meristem Maintenance. *CellReports* 10: 1819-1827.

Zhu Y Y, Machleder E M, Chenchik A, Li R, Siebert P D. 2001. Reverse transcriptase template switching: a SMART approach for full-length cDNA library construction. *Biotech* 30: 892-897.

Ziegenhain C, Vieth B, Parekh S, Reinius B, Guillaumet-Adkins A, Smets M, Leonhardt H, Heyn H, Hellmann I, Enard W. 2017. Comparative Analysis of Single-Cell RNA Sequencing Methods. *Molecular Cell* 65: 631-643.e4.

The invention claimed is:

1. A method for generating multiple sequencing libraries from a single full-length cDNA library comprising:
   a) providing RNA molecules comprising RNA 5' ends and reverse transcribing the RNA molecules with at least one template switching oligonucleotide (TSO) to generate the single full-length cDNA library, wherein cDNA in the single full-length cDNA library comprise sequences of the TSO at the 5'-end of the cDNA,
   b) isometric PCR amplification of the cDNA from said single full-length cDNA library into double-stranded (ds) cDNA,
   c) fragmenting said ds cDNA to generate ds cDNA fragments,
   d) adding bridge PCR compatible forward and reverse adapters to said ds cDNA fragments to generate a pool of ds cDNA fragments comprising sequences of the forward and reverse adapters,
   e) wherein c) and d) are optionally performed simultaneously by tagmentation of the ds cDNA fragments, and
   f) generating the multiple sequencing libraries by separating the pool of ds cDNA fragments into a first and a second aliquot wherein
   (i) the first aliquot is amplified using primers complementary to the sequences of the forward and reverse adapters added in d) to generate a sequencing compatible gene body cDNA library and
   (ii) the second aliquot is further split into a first and a second sub aliquot, wherein
      the first sub aliquot is amplified using a primer matching the sequence of the at least one TSO in a) and a primer matching the sequence of the forward adapter added in d) and
      the second sub-aliquot is amplified using a primer matching the sequence of the at least one TSO in a) and a primer matching the sequence of the reverse adapter added in d), and
   generating, from the first and second sub-aliquots, a sequencing compatible 5' end library, wherein a) to f) are performed sequentially.

2. A method for generating multiple sequencing libraries for analyzing RNA 5' ends comprising:
   a) providing RNA molecules comprising the 5' RNA ends and reverse transcribing the RNA molecules with at least one template switching oligonucleotide (TSO) to generate a full-length cDNA library, wherein the cDNA in the full-length cDNA library comprise sequences of the TSO at the 5'-end of the cDNA,
   b) isometric PCR amplification of the cDNA from said full-length cDNA library into double-stranded (ds) cDNA,
   c) fragmenting said double stranded cDNA to generate ds cDNA fragments,
   d) adding bridge PCR compatible forward and reverse adapters to said ds cDNA fragments to generate a pool of ds cDNA fragments comprising sequences of the forward and reverse adapters,
   e) wherein c) and d) are optionally performed simultaneously by tagmentation of the ds cDNA fragments, and
   f) separating the pool of ds cDNA fragments into a first and a second aliquot wherein
   (i) the first aliquot is amplified using primers complementary to the sequences of the forward and reverse adapters added in d) to generate a sequencing compatible gene body cDNA library and
   (ii) the second aliquot is further split into a first and second sub-aliquot, wherein
      the first sub aliquot is amplified using a primer matching the sequence of the at least one TSO of a) and a primer matching the sequence of the forward adapter added in d) and
      the second sub-aliquot is amplified using a primer matching the sequence of the at least one TSO of a) and a primer matching the sequence of the reverse adapter added in d) to generate a sequencing compatible 5' cDNA end library from said first and second sub-aliquot,
   g) sequencing of said sequencing compatible 5' cDNA end library with a forward sequencing primer matching the sequence of the at least one TSO to obtain sequencing data, and
   h) sequencing said sequencing compatible gene body cDNA library using sequencing primers to obtain sequencing data.

3. The method of claim 2, wherein the RNA 5' ends are analyzed and comprise consensus RNA 5' end sequences, wherein the consensus RNA 5' end sequences are identified by comparing the sequencing data of 2g) with the sequencing data of 2h), optionally using kernel density estimation.

4. The method according to claim 2, wherein the RNA 5' ends are analyzed by comparing the sequencing data of 2g) with the sequencing data of 2h), and are (i) 7-methylguanosine (m7G) capped and (ii) non-m7G capped RNA 5' ends, wherein the (i) and (ii) are simultaneously identified through the presence of one or more untemplated guanosines (uuGs) introduced into the cDNA in 2a).

5. The method according to claim 2, wherein the RNA 5' ends are identified from less than 0.5 µg of the RNA molecules.

6. The method according to claim 2, further comprising adding randomized nucleotides in d) and comparing the sequencing data of 2g) with the sequencing data of 2h), wherein a single RNA molecule comprising the 5' RNA ends is quantified via the randomized nucleotides added.

7. The method according to claim 1, further comprising adding 5' RNA adapters and ligating the 5' RNA adapters to the RNA molecules that are 5' phosphorylated RNA molecules before generating the single full-length cDNA library in a) and generating a further aliquot in f) used for identifying the 5' phosphorylated RNA molecules.

8. The method according to claim 1, further comprising adding 3' RNA adapters and ligating the 3' RNA adapters to the RNA molecules that are non-poly(A) RNA molecules before generating the single full-length cDNA library in a) and generating a further aliquot in f) used for identifying the non-poly(A) RNA molecules.

9. The method according to claim 1, further comprising performing size selection after b) to generate a further cDNA library, wherein the further cDNA library is subjected to c) to f) for identifying small RNA-directed cleavage products.

10. The method according to claim 2, wherein the RNA 5' ends comprise non-capped RNA 5' ends of small RNA cleavage products, the method further comprising
   ai) comparing a set of the 5' RNA ends to a set of small RNA sequences provided,
   bi) generating a cohort of at least 1000 randomized RNAs corresponding to each of the small RNA sequences provided,
   ci) calculating a base pairing strength score for each randomized RNA in the cohort and each of the small RNA sequences based on an analysis of its base pairing strength to each position in a reference transcriptome,
   di) comparing each position in the reference transcriptome with a base pairing strength score calculated in ci) to the base pairing strength score of the non-capped RNA 5' ends of the small RNA cleavage products to create a 5' end fold change, and
   ei) calculating a statistical likelihood of the existence of one of the small RNA cleavage products by combining the base pairing strengths from ci) and the 5' end fold change in di), wherein statistically significant combinations are indicating a small RNA cleavage site resulting in the small RNA cleavage products, wherein 5' end small RNA cleavage product are statistically identified.

11. The method of claim 1, wherein the RNA molecules are RNA molecules from single cells.

12. The method of claim 5, wherein the RNA 5' ends comprise products of sRNA-mediated cleavage events which are analyzed by comparing the sequencing data of 2g) with the sequencing data of 2h).

13. The method according to claim 10, wherein the 5' end base pairing signal at the small RNA cleavage site indicated is measured.

14. The method of claim 12, wherein the less than 0.5 µg RNA molecules are from single cells or cell types.

15. The method of claim 1 wherein c) and d) are performed simultaneously by tagmentation of the ds cDNA fragments.

16. The method of claim 4, wherein the RNA 5' ends are non-m7G capped ends and are identified from 1-5 ng of the RNA molecules.

* * * * *

SEQUENCE LISTING

<160> NUMBER OF SEQ ID NOS: 17

<210> SEQ ID NO 1
<211> LENGTH: 28
<212> TYPE: DNA
<213> ORGANISM: Artificial Sequence
<220> FEATURE:
<223> OTHER INFORMATION: primer

```
<220> FEATURE:
<221> NAME/KEY: misc_feature
<222> LOCATION: (27)..(27)
<223> OTHER INFORMATION: n at position 27, is any base
<220> FEATURE:
<221> NAME/KEY: misc_feature
<222> LOCATION: (28)..(28)
<223> OTHER INFORMATION: n at position 28, is either A, C or G

<400> SEQUENCE: 1
aagcagtggt atcaacgcag agtactnn                                              28

<210> SEQ ID NO 2
<211> LENGTH: 31
<212> TYPE: DNA
<213> ORGANISM: Artificial Sequence
<220> FEATURE:
<223> OTHER INFORMATION: primer
<220> FEATURE:
<221> NAME/KEY: misc_feature
<222> LOCATION: (26)..(26)
<223> OTHER INFORMATION: n at position 26, is ribonucleotide
<220> FEATURE:
<221> NAME/KEY: misc_feature
<222> LOCATION: (28)..(28)
<223> OTHER INFORMATION: n at position 28, is ribonucleotide
<220> FEATURE:
<221> NAME/KEY: misc_feature
<222> LOCATION: (30)..(30)
<223> OTHER INFORMATION: n at position 30, is any nucleotide that is
      modified with a locked nucleic acid (LNA)

<400> SEQUENCE: 2
aagcagtggt atcaacgcag agtacngngn g                                          31

<210> SEQ ID NO 3
<211> LENGTH: 32
<212> TYPE: DNA
<213> ORGANISM: Artificial Sequence
<220> FEATURE:
<223> OTHER INFORMATION: primer
<220> FEATURE:
<221> NAME/KEY: misc_feature
<222> LOCATION: (26)..(26)
<223> OTHER INFORMATION: n at position 26, is ribonucleotide
<220> FEATURE:
<221> NAME/KEY: misc_feature
<222> LOCATION: (28)..(28)
<223> OTHER INFORMATION: n at position 28, is ribonucleotide
<220> FEATURE:
<221> NAME/KEY: misc_feature
<222> LOCATION: (31)..(31)
<223> OTHER INFORMATION: n at position 31, is any nucleotide that is
      modified with a locked nucleic acid (LNA)

<400> SEQUENCE: 3
aagcagtggt atcaacgcag agtacngngg ng                                         32

<210> SEQ ID NO 4
<211> LENGTH: 23
<212> TYPE: DNA
<213> ORGANISM: Artificial Sequence
<220> FEATURE:
<223> OTHER INFORMATION: primer

<400> SEQUENCE: 4
aagcagtggt atcaacgcag agt                                                   23

<210> SEQ ID NO 5
<211> LENGTH: 70
<212> TYPE: DNA
```

```
<213> ORGANISM: Artificial Sequence
<220> FEATURE:
<223> OTHER INFORMATION: primer

<400> SEQUENCE: 5
aatgatacgg cgaccaccga gatctacact agatcgccta gcaagcagtg gtatcaacgc    60
agagtacggg                                                            70

<210> SEQ ID NO 6
<211> LENGTH: 70
<212> TYPE: DNA
<213> ORGANISM: Artificial Sequence
<220> FEATURE:
<223> OTHER INFORMATION: primer

<400> SEQUENCE: 6
aatgatacgg cgaccaccga gatctacacc tctctatcta gcaagcagtg gtatcaacgc    60
agagtacggg                                                            70

<210> SEQ ID NO 7
<211> LENGTH: 70
<212> TYPE: DNA
<213> ORGANISM: Artificial Sequence
<220> FEATURE:
<223> OTHER INFORMATION: primer

<400> SEQUENCE: 7
aatgatacgg cgaccaccga gatctacact atcctctcta gcaagcagtg gtatcaacgc    60
agagtacggg                                                            70

<210> SEQ ID NO 8
<211> LENGTH: 70
<212> TYPE: DNA
<213> ORGANISM: Artificial Sequence
<220> FEATURE:
<223> OTHER INFORMATION: primer

<400> SEQUENCE: 8
aatgatacgg cgaccaccga gatctacaca gagtagacta gcaagcagtg gtatcaacgc    60
agagtacggg                                                            70

<210> SEQ ID NO 9
<211> LENGTH: 70
<212> TYPE: DNA
<213> ORGANISM: Artificial Sequence
<220> FEATURE:
<223> OTHER INFORMATION: primer

<400> SEQUENCE: 9
aatgatacgg cgaccaccga gatctacacg taaggagcta gcaagcagtg gtatcaacgc    60
agagtacggg                                                            70

<210> SEQ ID NO 10
<211> LENGTH: 70
<212> TYPE: DNA
<213> ORGANISM: Artificial Sequence
<220> FEATURE:
<223> OTHER INFORMATION: primer

<400> SEQUENCE: 10
aatgatacgg cgaccaccga gatctacaca ctgcatacta gcaagcagtg gtatcaacgc    60
agagtacggg                                                            70
```

<210> SEQ ID NO 11
<211> LENGTH: 70
<212> TYPE: DNA
<213> ORGANISM: Artificial Sequence
<220> FEATURE:
<223> OTHER INFORMATION: primer

<400> SEQUENCE: 11
aatgatacgg cgaccaccga gatctacaca aggagtacta gcaagcagtg gtatcaacgc    60
agagtacggg                                                          70

<210> SEQ ID NO 12
<211> LENGTH: 70
<212> TYPE: DNA
<213> ORGANISM: Artificial Sequence
<220> FEATURE:
<223> OTHER INFORMATION: primer

<400> SEQUENCE: 12
aatgatacgg cgaccaccga gatctacacc taagcctcta gcaagcagtg gtatcaacgc    60
agagtacggg                                                          70

<210> SEQ ID NO 13
<211> LENGTH: 70
<212> TYPE: DNA
<213> ORGANISM: Artificial Sequence
<220> FEATURE:
<223> OTHER INFORMATION: primer

<400> SEQUENCE: 13
aatgatacgg cgaccaccga gatctacacc gtctaatcta gcaagcagtg gtatcaacgc    60
agagtacggg                                                          70

<210> SEQ ID NO 14
<211> LENGTH: 46
<212> TYPE: DNA
<213> ORGANISM: Artificial Sequence
<220> FEATURE:
<223> OTHER INFORMATION: primer

<400> SEQUENCE: 14
caagcagaag acggcatacg agattaaggc gatcgtcggc agcgtc                  46

<210> SEQ ID NO 15
<211> LENGTH: 47
<212> TYPE: DNA
<213> ORGANISM: Artificial Sequence
<220> FEATURE:
<223> OTHER INFORMATION: primer

<400> SEQUENCE: 15
caagcagaag acggcatacg agattaaggc gagtctcgtg ggctcgg                 47

<210> SEQ ID NO 16
<211> LENGTH: 33
<212> TYPE: DNA
<213> ORGANISM: Artificial Sequence
<220> FEATURE:
<223> OTHER INFORMATION: primer

<400> SEQUENCE: 16
ctagcaagca gtggtatcaa cgcagagtac ggg                                33

```
<210> SEQ ID NO 17
<211> LENGTH: 33
<212> TYPE: DNA
<213> ORGANISM: Artificial Sequence
<220> FEATURE:
<223> OTHER INFORMATION: primer

<400> SEQUENCE: 17
cccgtactct gcgttgatac cactgcttgc tag                              33
```